United States Patent
Cruz-Hernandez et al.

(10) Patent No.: US 8,860,563 B2
(45) Date of Patent: Oct. 14, 2014

(54) HAPTIC EFFECT CONVERSION SYSTEM USING GRANULAR SYNTHESIS

(71) Applicant: Immersion Corporation, San Jose, CA (US)

(72) Inventors: Juan Manuel Cruz-Hernandez, Montreal (CA); Ali Modarres, Mont-Royal (CA); Liwen Wu, Verdun (CA); David Birnbaum, Oakland, CA (US)

(73) Assignee: Immersion Corporation, San Jose, CA (US)

( * ) Notice: Subject to any disclaimer, the term of this patent is extended or adjusted under 35 U.S.C. 154(b) by 5 days.

(21) Appl. No.: 13/803,778

(22) Filed: Mar. 14, 2013

(65) Prior Publication Data

US 2013/0335209 A1 Dec. 19, 2013

Related U.S. Application Data

(60) Provisional application No. 61/659,659, filed on Jun. 14, 2012, provisional application No. 61/702,870, filed on Sep. 19, 2012, provisional application No. 61/756,347, filed on Jan. 24, 2013.

(51) Int. Cl.
*G08B 6/00* (2006.01)

(52) U.S. Cl.
USPC .................................... 340/407.2; 340/407.1

(58) Field of Classification Search
USPC ........... 340/407.1, 407.2, 506, 664, 4.12, 7.6; 310/317, 331; 345/156, 173
See application file for complete search history.

(56) References Cited

U.S. PATENT DOCUMENTS

| | | | |
|---|---|---|---|
| 7,468,573 B2 * | 12/2008 | Dai et al. ...................... | 310/317 |
| 7,979,146 B2 | 7/2011 | Ullrich et al. | |
| 8,000,825 B2 | 8/2011 | Ullrich et al. | |
| 8,203,444 B2 * | 6/2012 | Strohallen et al. ............ | 340/506 |
| 8,378,964 B2 | 2/2013 | Ullrich et al. | |
| 2002/0030663 A1 * | 3/2002 | Tierling et al. ............... | 345/156 |
| 2003/0231170 A1 * | 12/2003 | Yoshikawa et al. ........... | 345/173 |
| 2010/0013649 A1 * | 1/2010 | Spira ............................ | 340/664 |
| 2011/0202155 A1 | 8/2011 | Ullrich et al. | |
| 2011/0215913 A1 | 9/2011 | Ullrich et al. | |
| 2012/0206246 A1 | 8/2012 | Cruz-Hernandez | |
| 2012/0206247 A1 | 8/2012 | Bhatia | |
| 2012/0306631 A1 | 12/2012 | Hughes | |

OTHER PUBLICATIONS

Jason D. Fleming, U.S. Appl. No. 13/546,351, filed Jul. 11, 2012.
Henry Da Costa, U.S. Appl. No. 13/439,241, filed Apr. 4, 2012.
Satvir Singh Bhatia, U.S. Appl. No. 13/661,140, filed Oct. 26, 2012.
Henry Da Costa, U.S. Appl. No. 13/667,003, filed Nov. 2, 2012.
Henry Da Costa, U.S. Appl. No. 13/709,157, filed Dec. 10, 2012.

(Continued)

*Primary Examiner* — Van T. Trieu
(74) *Attorney, Agent, or Firm* — Miles & Stockbridge P.C.

(57) ABSTRACT

A system is provided that converts an input, such as audio data, into one or more haptic effects. The system applies a granular synthesis algorithm to the input in order to generate a haptic signal. The system subsequently outputs the one or more haptic effects based on the generated haptic signal. The system can also shift a frequency of the input, and also filter the input, before the system applies the granular synthesis algorithm to the input.

45 Claims, 21 Drawing Sheets

(56) References Cited

OTHER PUBLICATIONS

Juan Manuel Cruz-Hernandez, U.S. Appl. No. 13/767,129, filed Feb. 14, 2013.
Christopher J. Ullrich, U.S. Appl. No. 13/785,166, filed Mar. 5, 2013.
Christopher J. Ullrich, U.S. Appl. No. 13/743,540, filed Jan. 17, 2013.
Juan Manuel Cruz-Hernandez, U.S. Appl. No. 13/799,059, filed Mar. 13, 2013.
Christopher J. Ullrich, U.S. Appl. No. 13/788,487, filed Mar. 7, 2013.
Wikipedia, the free encyclopedia, "Granular synthesis", http://en.wikipedia.org/wiki/Granular_synthesis, Mar. 14, 2013.
Granular Synthesis: Guide, "Granularsynthesis, A Granular Synthesis Resource Web Site", http://granularsynthesis.com/guide.php, Mar. 14, 2013.

* cited by examiner

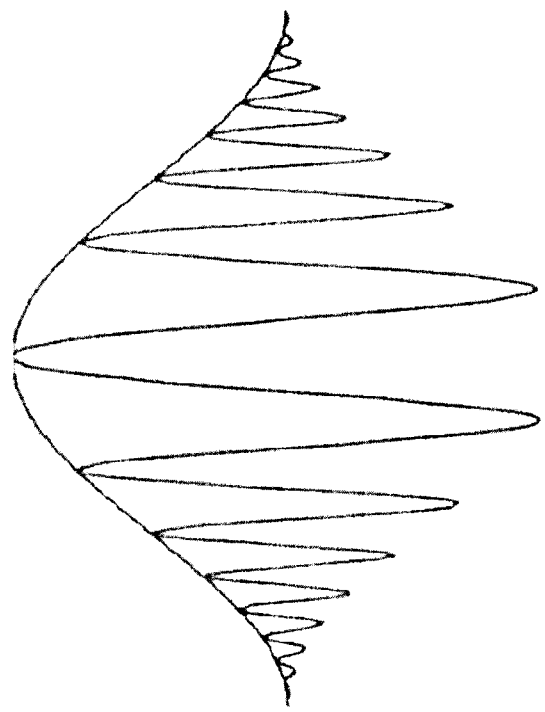
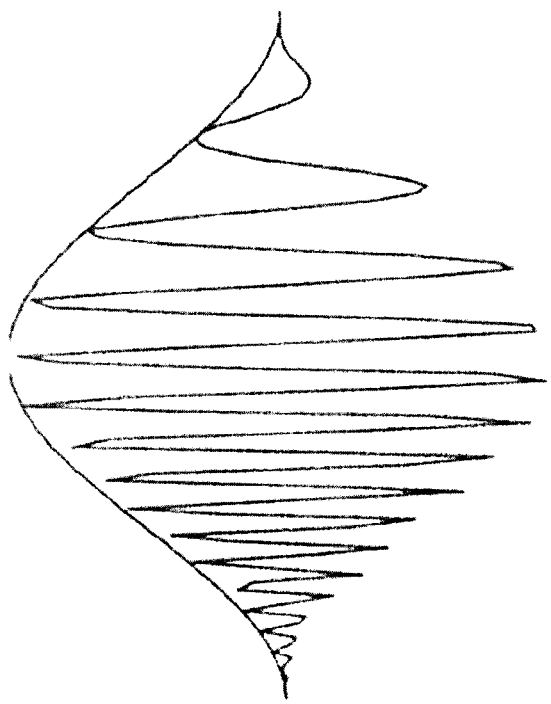
Fig. 6

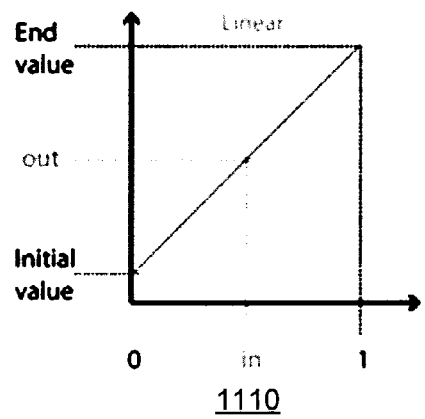
1110
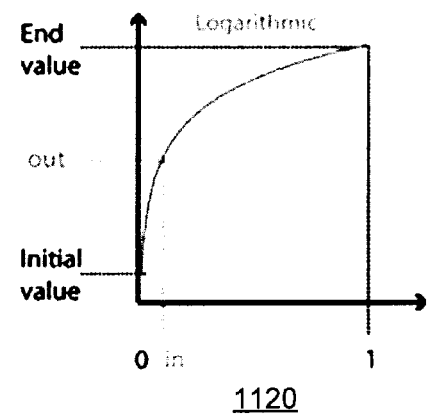
1120
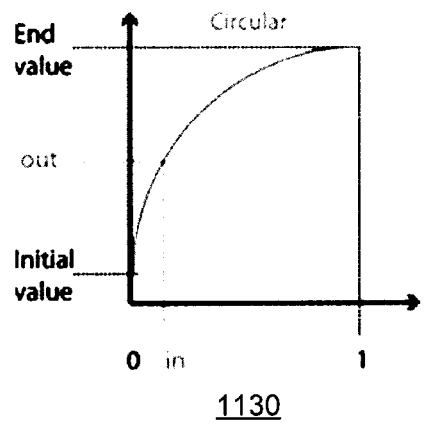
1130
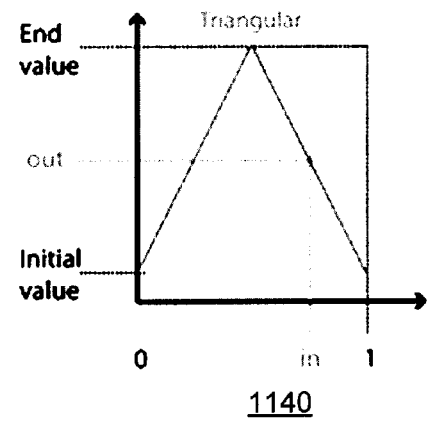
1140
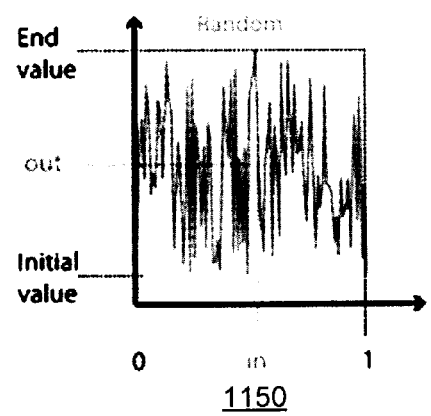
1150
Fig. 11

HAPTIC EFFECT CONVERSION SYSTEM USING GRANULAR SYNTHESIS

CROSS-REFERENCE TO RELATED APPLICATIONS

This application claims priority of U.S. Provisional Patent Application Ser. No. 61/659,659, filed on Jun. 14, 2012 (the disclosure of which is hereby incorporated by reference), U.S. Provisional Patent Application Ser. No. 61/702,870, filed on Sep. 19, 2012 (the disclosure of which is hereby incorporated by reference), and U.S. Provisional Patent Application Ser. No. 61/756,347, filed on Jan. 24, 2013 (the disclosure of which is hereby incorporated by reference).

FIELD

One embodiment is directed generally to haptic effects, and more particularly, to a device that produces haptic effects in association with other related output.

BACKGROUND

Haptics is a tactile and force feedback technology that takes advantage of a user's sense of touch by applying haptic feedback effects (i.e., "haptic effects"), such as forces, vibrations, and motions, to the user. Devices, such as mobile devices, touchscreen devices (also identified as "touchscreens"), and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect.

A haptic effect can be generated by combining two or more periodic haptic signals, or by pre-processing a received signal in order to trigger a haptic effect in real-time. However, such haptic effects can be perceived as "synthetic" or "artificial," due to the nature of how the haptic effects are generated.

SUMMARY

One embodiment is a system that converts an input, such as audio data or video data, into one or more haptic effects. The system receives the input. The system further segments the input into a plurality of waveforms, where each waveform includes at least a portion of the input. The system further combines each waveform with an envelope to generate a grain, where a plurality of grains is generated, and where each grain includes an amplitude parameter, a waveform parameter, an envelope parameter, and a duration parameter. The system further combines the plurality of grains to generate a cloud, where the cloud includes a representation of the plurality of grains. The system further generates the one or more haptic effects based on the cloud.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 6 illustrates example grains that are generated using sinusoids as a waveform type, according to an embodiment of the invention.

FIG. 11 illustrates example interpolators, according to an embodiment of the invention.

DETAILED DESCRIPTION

Figure 1:
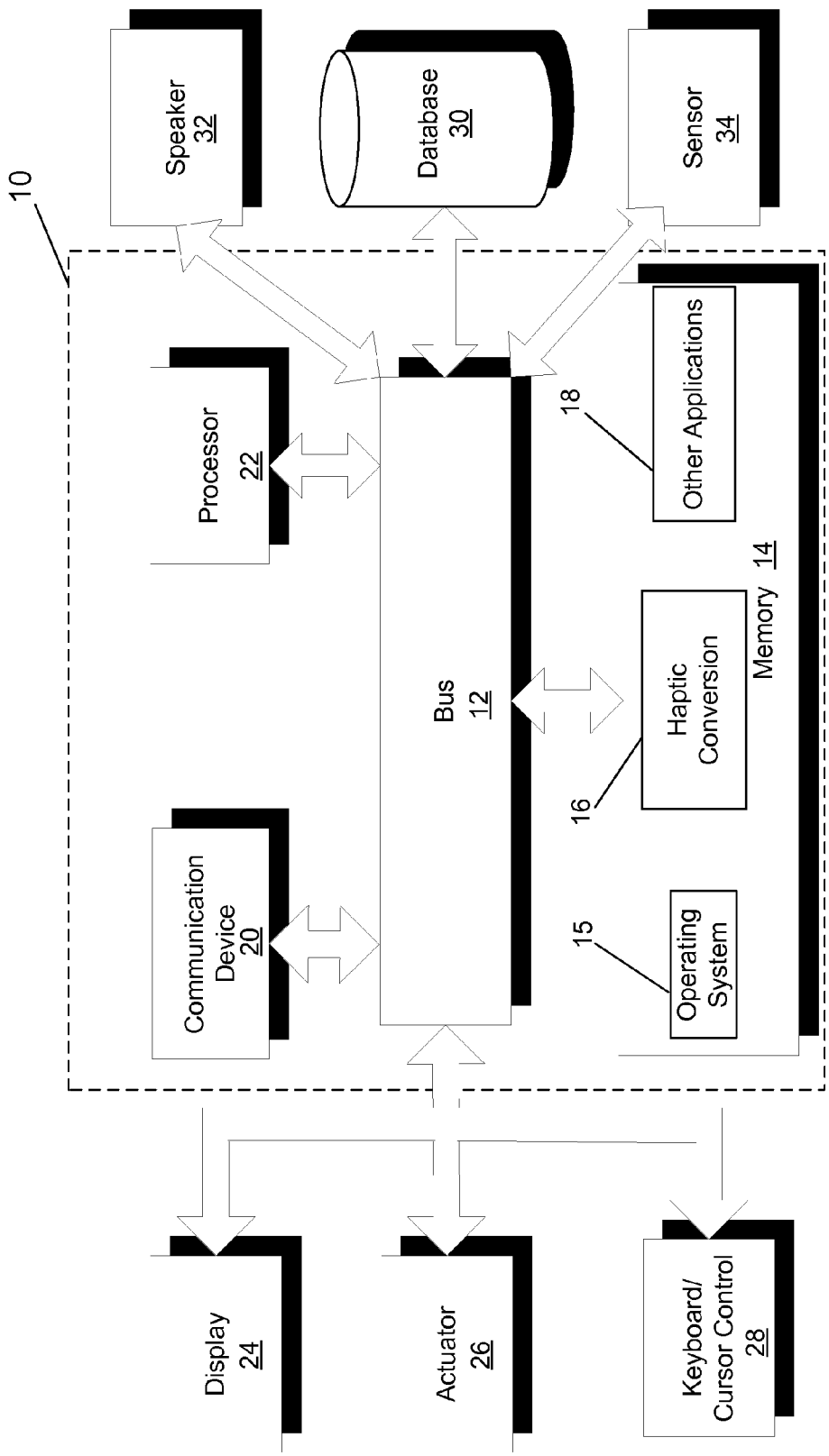
FIG. 1 illustrates a system in accordance with one embodiment of the invention.

One embodiment is a system that can automatically convert an input, such as audio data, into a haptic effect using granular synthesis. The haptic effect can be stored in the format of a haptic primitive, or can be stored in an alternate format. Through granular synthesis, the input can be segmented into several waveforms, and each waveform can be combined with an envelope to create a "grain." Through this algorithm, several grains can be created, and the grains can be combined to form a "cloud." The cloud can then be used to generate a haptic signal, and the haptic signal can subsequently be used to generate the haptic effect. The input can be optionally modified through either frequency-shifting, or a combination of frequency-shifting and filtering, before granular synthesis is applied to the input.

As described below, a "dynamic haptic effect" refers to a haptic effect that evolves over time as it responds to one or more input parameters. Dynamic haptic effects are haptic or vibrotactile effects displayed on haptic devices to represent a change in state of a given input signal. The input signal can be a signal captured by sensors on the device with haptic feedback, such as position, acceleration, pressure, orientation, linear velocity, angular velocity, temperature, or proximity, or signals captured by other devices and sent to the haptic device to influence the generation of the haptic effect.

A dynamic effect signal can be any type of signal, but does not necessarily have to be complex. For example, a dynamic effect signal may be a simple sine wave that has some property such as phase, frequency, or amplitude that is changing over time or reacting in real time according to a mapping scheme which maps an input parameter onto a changing property of the effect signal. An input parameter may be any type of input capable of being provided by a device, and typically may be any type of signal such as a device sensor signal. A device sensor signal may be generated by any means, and typically may be generated by capturing a user gesture with a device. Dynamic effects may be very useful for gesture interfaces, but the use of gestures or sensors are not necessarily required to create a dynamic signal.

One common scenario that does not involve gestures directly is defining the dynamic haptic behavior of an animated widget. For example, when a user scrolls a list, it is not typically the haptification of the gesture that will feel most intuitive, but instead the motion of the widget in response to the gesture. In the scroll list example, gently sliding the list may generate a dynamic haptic feedback that changes according to the speed of the scrolling, but flinging the scroll bar may produce dynamic haptics even after the gesture has ended. This creates the illusion that the widget has some physical properties and it provides the user with information about the state of the widget such as its velocity or whether it is in motion.

A gesture is any movement of the body that conveys meaning or user intent. It will be recognized that simple gestures may be combined to form more complex gestures. For example, bringing a finger into contact with a touch sensitive surface may be referred to as a "finger on" gesture, while removing a finger from a touch sensitive surface may be referred to as a separate "finger off" gesture. If the time between the "finger on" and "finger off" gestures is relatively short, the combined gesture may be referred to as "tapping"; if the time between the "finger on" and "finger off" gestures is relatively long, the combined gesture may be referred to as "long tapping"; if the distance between the two dimensional (x,y) positions of the "finger on" and "finger off" gestures is relatively large, the combined gesture may be referred to as "swiping"; if the distance between the two dimensional (x,y) positions of the "finger on" and "finger off" gestures is relatively small, the combined gesture may be referred to as "smearing", "smudging" or "flicking". Any number of two dimensional or three dimensional simple or complex gestures may be combined in any manner to form any number of other gestures, including, but not limited to, multiple finger contacts, palm or first contact, or proximity to the device. A gesture can also be any form of hand movement recognized by a device having an accelerometer, gyroscope, or other motion sensor, and converted to electronic signals. Such electronic signals can activate a dynamic effect, such as shaking virtual dice, where the sensor captures the user intent that generates a dynamic effect.

FIG. 1 illustrates a block diagram of a system 10 in accordance with one embodiment of the invention. In one embodiment, system 10 is part of a device, and system 10 provides a haptic conversion functionality for the device. In another embodiment, system 10 is separate from the device, and remotely provides the haptic conversion functionality for the device. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a device in one embodiment. The modules further include a haptic conversion module 16 that converts an input into one or more haptic effects, as disclosed in more detail below. In certain embodiments, haptic conversion module 16 can comprise a plurality of modules, where each individual module provides specific individual functionality for converting an input into one or more haptic effects. System 10 will typically include one or more additional application modules 18 to include additional functionality, such as Integrator™ software by Immersion Corporation.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

Processor 22 is further coupled via bus 12 to a display 24, such as a Liquid Crystal Display ("LCD"), for displaying a graphical representation or user interface to a user. The display 24 may be a touch-sensitive input device, such as a touchscreen, configured to send and receive signals from processor 22, and may be a multi-touch touchscreen. Processor 22 may be further coupled to a keyboard or cursor control 28 that allows a user to interact with system 10, such as a mouse or a stylus.

System 10, in one embodiment, further includes an actuator 26. Processor 22 may transmit a haptic signal associated with a generated haptic effect to actuator 26, which in turn outputs haptic effects such as vibrotactile haptic effects, electrostatic friction haptic effects, or deformation haptic effects. Actuator 26 includes an actuator drive circuit. Actuator 26 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In alternate embodiments, system 10 can include one or more additional actuators, in addition to actuator 26 (not illustrated in FIG. 1). Actuator 26 is an example of a haptic output device, where a haptic output device is a device configured to output haptic effects, such as vibrotactile haptic effects, electrostatic friction haptic effects, or deformation haptic effects, in response to a drive signal. In alternate embodiments, actuator 26 can be replaced by some other type of haptic output device. Further, in other alternate embodiments, system 10 may not include actuator 26, and a separate device from system 10 includes an actuator, or other haptic output device, that generates the haptic effects, and system 10 sends generated haptic effect signals to that device through communication device 20.

System 10 can further be operatively coupled to a database 30, where database 30 can be configured to store data used by modules 16 and 18. Database 30 can be an operational database, an analytical database, a data warehouse, a distributed database, an end-user database, an external database, a navigational database, an in-memory database, a document-oriented database, a real-time database, a relational database, an object-oriented database, or any other database known in the art.

In one embodiment, system 10 further includes one or more speakers 32. Processor 22 may transmit an audio signal to speaker 32, which in turn outputs audio effects. Speaker 32 may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker.

System 10, in one embodiment, further includes a sensor 34. Sensor 34 can be configured to detect a form of energy, or other physical property, such as, but not limited to, acceleration, bio signals, distance, flow, force/pressure/strain/bend, humidity, linear position, orientation/inclination, radio frequency, rotary position, rotary velocity, manipulation of a switch, temperature, vibration, or visible light intensity. Sensor 34 can further be configured to convert the detected energy, or other physical property, into an electrical signal, or any signal that represents virtual sensor information. Sensor 34 can be any device, such as, but not limited to, an accelerometer, an electrocardiogram, an electroencephalogram, an electromyograph, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense CPS$^2$ 155, a miniature pressure transducer, a piezo sensor, a strain gage, a hygrometer, a linear position touch sensor, a linear potentiometer (or slider), a linear variable differential transformer, a compass, an inclinometer, a magnetic tag (or radio frequency identification tag), a rotary encoder, a rotary potentiometer, a gyroscope, an on-off switch, a temperature sensor (such as a thermometer, thermocouple, resistance temperature detector, thermistor, or temperature-transducing integrated circuit), microphone, photometer, altimeter, bio monitor, or a light-dependent resistor.

Figure 2:
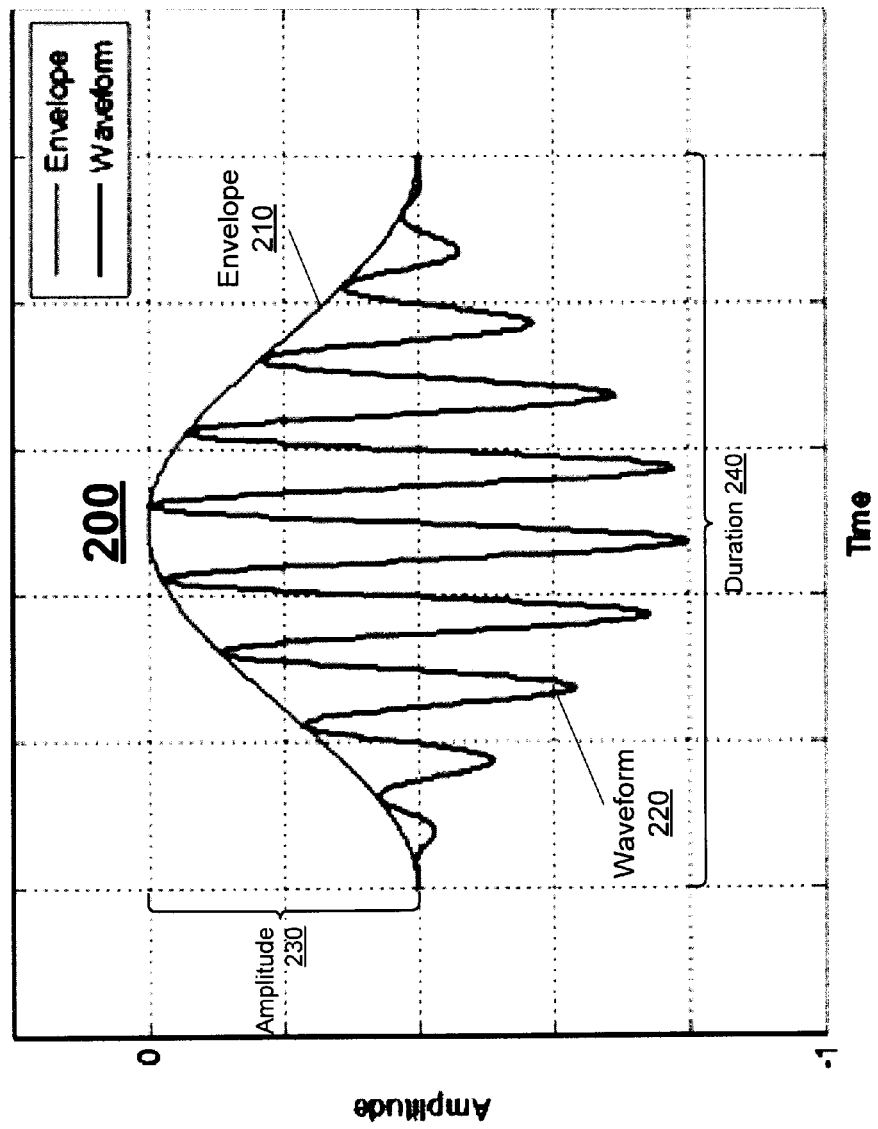
FIG. 2 illustrates an example of a grain, according to an embodiment of the invention.

FIG. 2 illustrates an example of a "grain" 200, according to an embodiment of the invention. Grain 200 is a building block of data, such as audio data. Grain 200 is a fundamental microevent that, when combined with other grains, produces an object identified as a "cloud," where a cloud is a spatial representation of multiple grains over time. Grain 200 is a combination of a waveform and an envelope, where a waveform and an envelope are further described in greater detail. Thus, a grain, such as grain 200, can be considered an enveloped waveform. A grain, such as grain 200, can have a very short duration approaching a limit of perception, such as a duration amount of 100 milliseconds ("ms") or less. Grain 200 captures time domain and frequency domain information which influences perception of the data. As described below, a cloud can have any number of grains, such as hundreds or thousands of grains, with different properties.

According to the embodiment, grain 200 includes a plurality of parameters that describe grain 200. Each parameter can include a value that defines a characteristic of grain 200. In the illustrated embodiment, grain 200 includes an envelope 210, a waveform 220, an amplitude 230, and a duration 240. Envelope 210 is a curve that joins the peaks of waveform 220 of grain 200. In one embodiment, grain 200 can include an envelope parameter that defines envelope 210. Envelope 210 of grain 200 is further described below in conjunction with FIG. 3.

Waveform 220 is an oscillating signal with a specific shape and form. A waveform, such as waveform 220, can include sampled data, such as sampled audio data, or can be a generated waveform that includes static or dynamic data. Further, a waveform, such as waveform 220, can be a constant waveform, but waveform 220 can also vary from grain to grain within a cloud, or can be constant for all grains in the same cloud. In certain embodiments, a waveform, such as waveform 220, can be a sinusoid or sine wave. In other embodiments, a waveform, such as waveform 220, can be a superposition of a sinusoid or sine wave. In yet other embodiments, a waveform, such as waveform 220, can be a sinusoid or sine wave with a frequency content variation (i.e., a sinusoid or sine wave that varies a frequency within a grain). In further embodiments, a waveform, such as waveform 220, can be superimposed sinusoid or sine waves with a frequency content variation (i.e., a sinusoid or sine wave that varies a frequency within a grain). In yet further embodiments, a waveform, such as waveform 220, can be a time-varying waveform generating using a mathematical algorithm, such as frequency modulation ("FM"), phase modulation ("PM"), or Physically Inspired Stochastic Event Modeling ("PhiSEM"). FM, PM, and PhiSEM are further described in greater detail in U.S. patent application Ser. No. 13/767,129, filed on Feb. 14, 2013, entitled "HIGH DEFINITION HAPTIC EFFECTS GENERATION USING PRIMITIVES." In yet further embodiments, a waveform, such as waveform 220, can be a sampled recorded signal, such as a sampled recorded audio signal, where the sampled recorded signal can either be constant or can vary over time. In one embodiment, grain 200 can include a waveform parameter that defines waveform 220.

According to the illustrated embodiment, amplitude 230 is a maximum amplitude value of grain 200. In one embodiment, grain 200 can include an amplitude parameter that defines amplitude 230. Duration 240 is a duration (i.e., a time width) of grain 200. A duration, such as duration 240, is usually measured in milliseconds. In one embodiment, grain 200 can include a duration parameter that defines duration 240. According to an embodiment, by changing a value of the amplitude parameter of grain 200, one can change amplitude 230 of grain 200. Further, by changing a value of the duration parameter of grain 200, one can change duration 240 of gain 200. In an alternate embodiment, grain 200 can also include a density parameter that defines a density of grain 200 (not illustrated in FIG. 2). A density of grain 200 is a value that defines a number of instances of grain 200 per second within a cloud.

Figure 3:
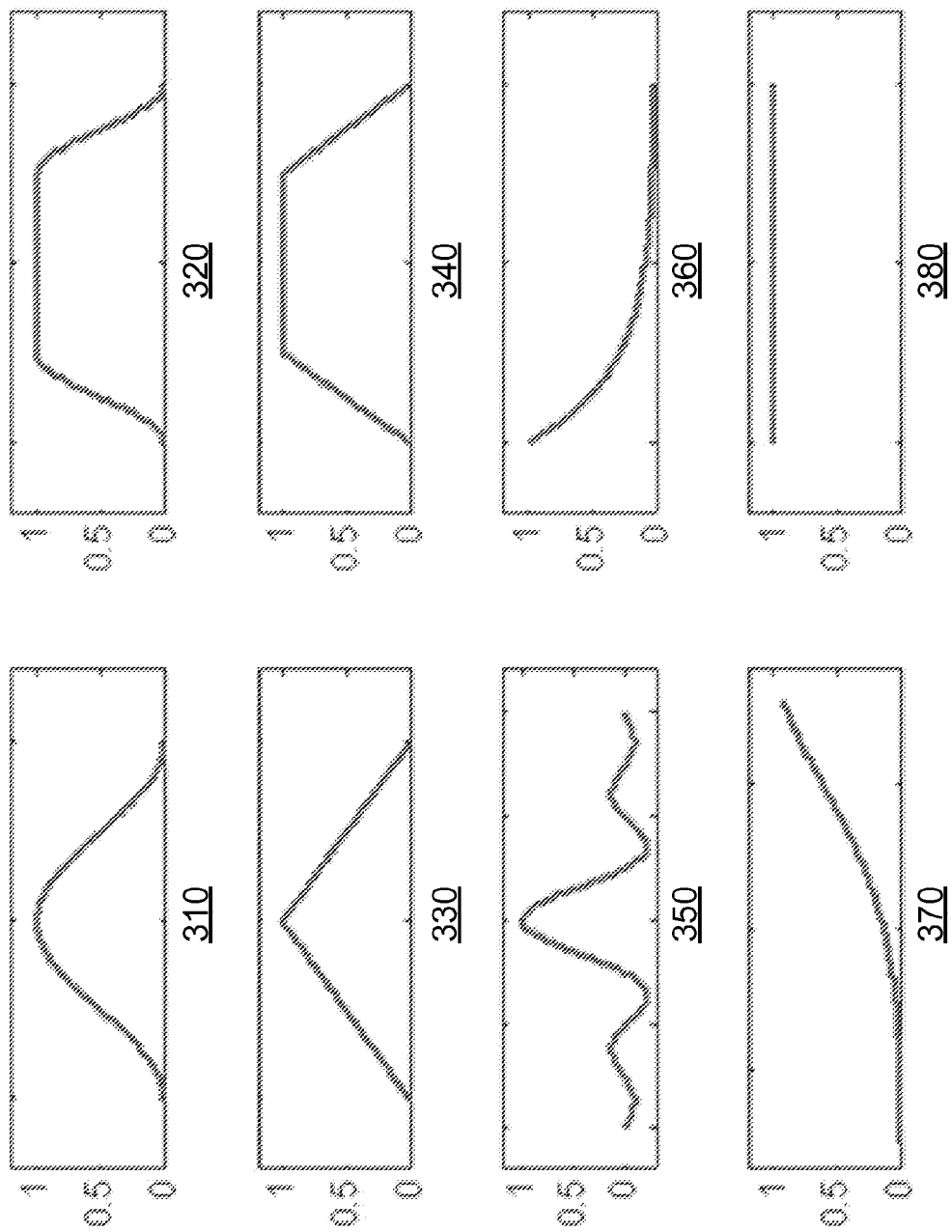
FIG. 3 illustrates examples of envelope types, according to an embodiment of the invention.

FIG. 3 illustrates examples of envelope types, according to an embodiment of the invention. The envelope types illustrated in FIG. 3 are examples of envelope types that can be used to create an envelope, where an envelope can be combined with a waveform to create a grain. According to the embodiment, an envelope type can be used, along with a duration and amplitude, to create an envelope. An envelope type's duration and amplitude can influence the frequency content of the envelope.

The illustrated embodiment of FIG. 3 illustrates sine envelope type 310, saturated sine envelope type 320, triangle envelope type 330, saturated envelope type 340, sinc envelope type 350, expodec envelope type 360, rexpodec envelope type 370, and square envelope type 380. Corresponding definitions for the envelope types illustrated in FIG. 3 are described below:

| Envelope Type | Description |
| --- | --- |
| Sine | Envelope = $0.5 - 0.5 + \cos(2\pi ft)$ |
| Saturated Sine | $x = \dfrac{t}{\text{Duration}}$ <br> Envelope = $\begin{cases} -\dfrac{\cos(2\pi 2x) - 1}{2}, & \text{if } x \in [0, 0.25] \\ 1, & \text{if } x \in [0.25, 0.75] \\ \dfrac{\cos(2\pi 2(x - 0.25)) + 1}{2}, & \text{if } x \in [0.75, 1.0] \end{cases}$ |
| Triangle | $x = \dfrac{t}{\text{Duration}}$ <br> Envelope = $\begin{cases} 2x, & \text{if } x \in [0, 0.5] \\ -2x + 2, & \text{if } x \in [0.5, 1.0] \end{cases}$ |
| Saturated Triangle | $x = \dfrac{t}{\text{Duration}}$ <br> Envelope = $\begin{cases} 4x, & \text{if } x \in [0, 0.25] \\ 1, & \text{if } x \in [0.25, 0.75] \\ -4x + 4, & \text{if } x \in [0.75, 1] \end{cases}$ |
| Sinc | $x = 4\pi\left(\dfrac{2t}{\text{Duration}} - 1\right)$ <br> Envelope = $\dfrac{\sin(x)}{x}$ |
| Expodec | $x = \dfrac{t}{\text{Duration}} - 1$ <br> Envelope = $e^{2.5x}$ |
| Rexpodec | $x = \dfrac{t}{\text{Duration}}$ <br> Envelope = $e^{-2.5x}$ |
| Square | Envelope = 1 |

One of ordinary skill in the art would readily appreciate that the envelope types illustrated in FIG. 3 are example envelope types in accordance with an embodiment, and that in alternate embodiments, a different envelope type can be used to create an envelope.

Figure 4:
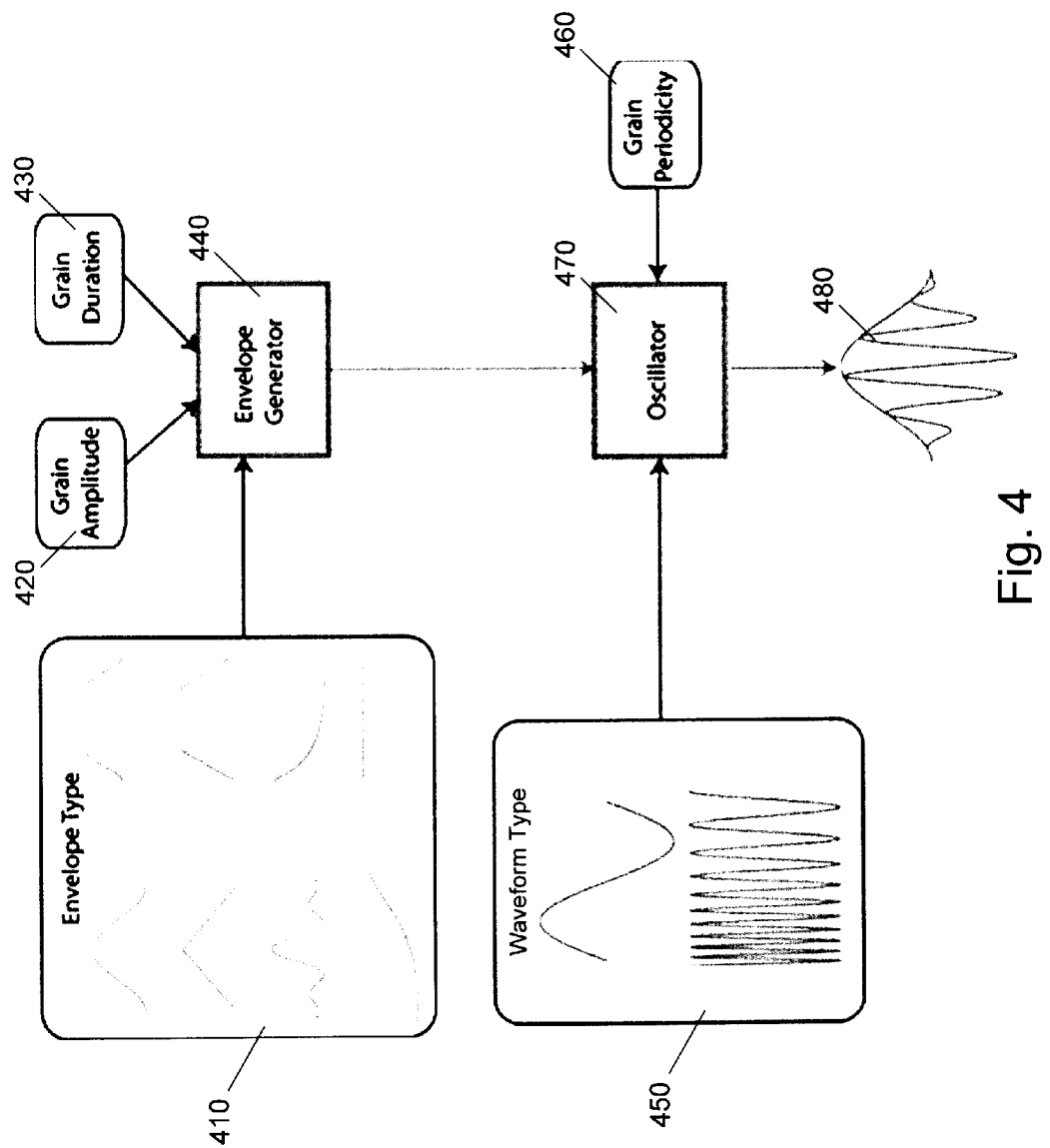
FIG. 4 illustrates a block diagram representation of granular synthesis generation using a single output channel, according to an embodiment of the invention.

FIG. 4 illustrates a block diagram representation of granular synthesis generation using a single output channel, according to an embodiment of the invention. More specifically, FIG. 4 illustrates how to generate a grain, and how to output the grain to an output channel, where an output channel can be operatively coupled to a haptic output device, such as an actuator. FIG. 4 includes envelope type 410. Envelope type 410 can select an envelope type, and can output the envelope type to envelope generator 440. In certain embodiments, the envelope type selected by envelope type 410 can be one of the envelope types illustrated in FIG. 3. FIG. 4 further includes grain amplitude 420. Grain amplitude 420 can specify an amplitude value, and can provide the amplitude value to envelope generator 440. FIG. 4 further includes grain duration 430. Grain duration 430 can specify a duration value, and can provide the duration value to envelope generator 440. FIG. 4 further includes envelope generator 440. Envelope generator 440 can generate an envelope based on the envelope type received from envelope type 410, the amplitude value received from gain amplitude 420, and the duration value received from grain duration 430. Envelope generator 440 can subsequently output the generated envelope to oscillator 470.

FIG. 4 further illustrates waveform type 450. Waveform type 450 can select a waveform and output the waveform to oscillator 470. FIG. 4 further includes grain periodicity 460. Grain periodicity 460 can specify a periodicity value (i.e., density value) that indicates how frequently a grain will be generated repeatedly, and can provide the periodicity value (i.e., density value) to oscillator 470. Oscillator 470 can generate grain 480 based upon the envelope received from envelope generator 440, the waveform received from waveform type 450, and the periodicity value (i.e., density value) received from grain periodicity 460. According to the embodiment, grain 480 can be output to a single output channel. More specifically, grain 480 can be output to the output channel depending on a type of synthesis being used to create a cloud. A cloud, as previously described, is a spatial representation of multiple grains over time.

Figure 5:
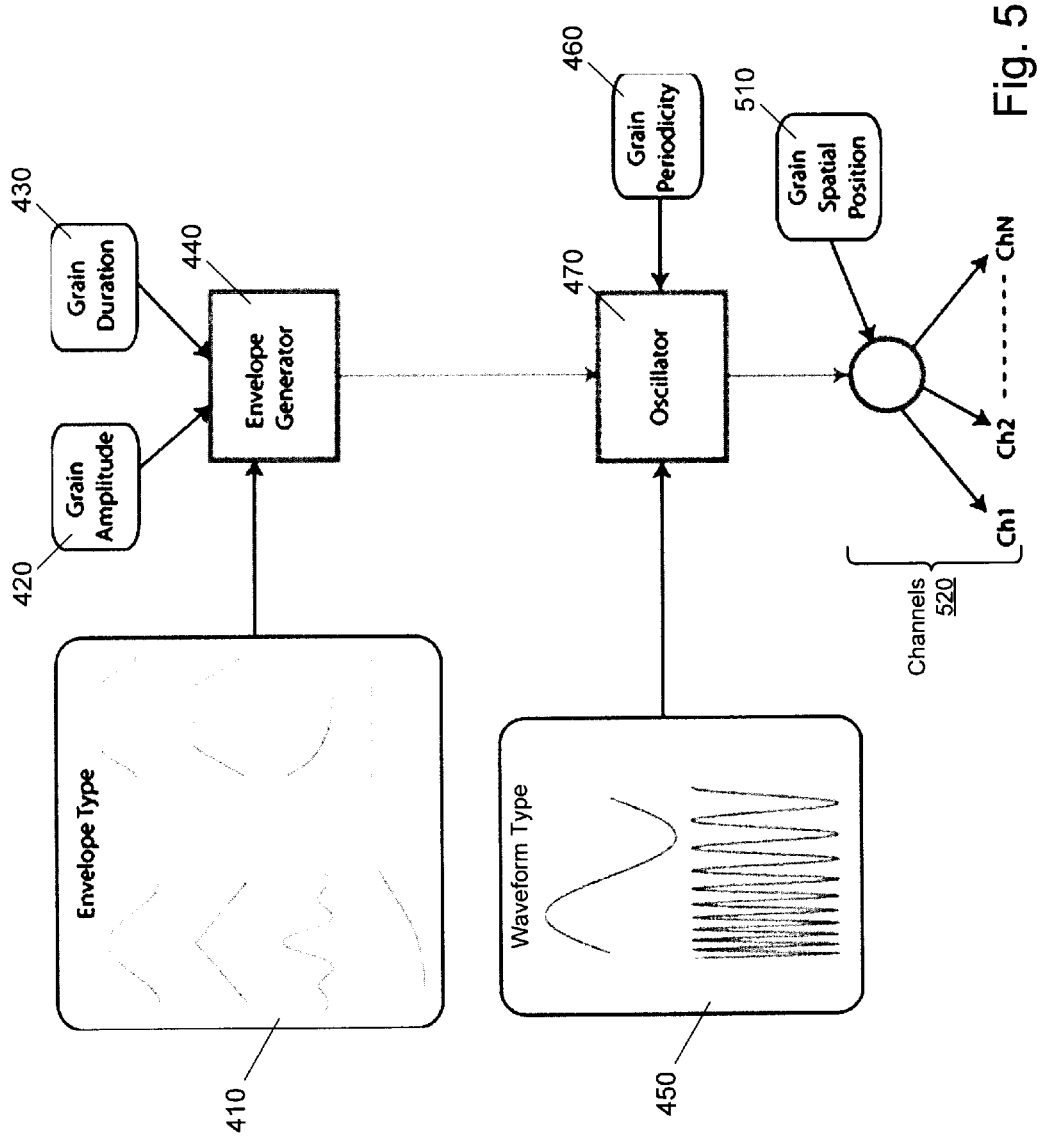
FIG. 5 illustrates a block diagram representation of granular synthesis generation using a plurality of output channels, according to an embodiment of the invention.

FIG. 5 illustrates a block diagram representation of granular synthesis generation using a plurality of output channels, according to an embodiment of the invention. More specifically, FIG. 5 illustrates how to generate a grain, and how to output the grain to a plurality of output channels, where each output channel can be operatively coupled to a haptic output device, such as an actuator. Thus, according to the embodiment, a grain can be output to a plurality of haptic output devices (e.g., actuators). The block diagram representation of FIG. 5 is similar to the block diagram representation of FIG. 4, and components of FIG. 5 that are identical to components of FIG. 4 are not further described.

FIG. 5 includes grain spatial position 510. Grain spatial position 510 specifies a channel value, where a channel value is associated with an output channel. FIG. 5 further includes output channels 520. Output channels 520 represents a plurality of output channels. A grain that is generated is output to a specific output channel of output channels 520 based on the channel value specified by grain spatial position 520.

FIG. 6 illustrates example grains that are generated using sinusoids as a waveform type, according to an embodiment of the invention. As previously described, a sinusoid is a specific type of waveform, where a sinusoid can be based on a sinusoid signal (e.g., $M*\sin(2\pi ft)$) with a constant frequency over its duration. According to an embodiment, rather than having a constant frequency over its duration, a sinusoid can vary its frequency over the duration by implementing a "glissando," which is a term used in music to denote a change in pitch in sound. In engineering terms, a glissando is basically a function parameterized by an initial frequency value and an end frequency value, where a transition in frequency occurs over a duration of the grain.

In the illustrated embodiment of FIG. 6, grain 610 is a grain that includes a sinusoid where a variation in frequency is implemented by moving from an initial frequency value to an end frequency value during the duration of the sinusoid. This is identified as "Glissando-Up." Further, grain 620 is a grain that includes a sinusoid where a variation in frequency is implemented by moving from an initial frequency value to an end frequency value, and then returning to the initial frequency value during the duration of the sinusoid. This is identified as "Glissando-Up-Down." According to the illustrated embodiment, the sinusoids of grains 610 and 620 can be generated using a mathematical algorithm, such as frequency modulation ("FM"), phase modulation ("PM"), or Physically Inspired Stochastic Event Modeling ("PhiSEM"). FM, PM, and PhiSEM are further described in greater detail in U.S. patent application Ser. No. 13/767,129, filed on Feb. 14, 2013, entitled "HIGH DEFINITION HAPTIC EFFECTS GENERATION USING PRIMITIVES." In an alternate embodiment, a sinusoid can vary its frequency over its duration through the use of a random frequency value limited between an initial frequency value and an end frequency value. In this embodiment, a frequency content can vary between two fixed frequency values in a random fashion.

As previously described, grains that are generated can be combined into a cloud, where a cloud is a spatial representation of the grains over time. One of several granular synthesis algorithms can be used to organize the grains. Such algorithms are described here in further detail.

One granular synthesis algorithm involves matrices and screens on a time-frequency plane. A screen is a plane of amplitude and frequency upon which multiple grains can be scattered, where each grain can be a time slice or a frame of a film. These planes can be seen as time-frequency matrices, from which effects, such as audio effects, can be generated. Other similar granular synthesis algorithms can be produced with a short-time Fourier transform, or a wavelet transform.

Another granular synthesis algorithm is a pitch synchronous granular synthesis algorithm. This algorithm uses a complex system of parallel minimum-phase finite impulse response generators to resynthesize grains based on a spectrum analysis.

Another granular synthesis algorithm is a synchronous granular synthesis algorithm. The synchronous granular synthesis algorithm is an algorithm that places grains in a cloud at sequential (i.e., periodic) time locations in a linear timeline within the cloud, with optional delay periods between the grains, where a delay period is a period of time where no grains are present. The synchronous granular synthesis algorithm is further described in greater detail in conjunction with FIG. 7.

Another granular synthesis algorithm is a quasi-synchronous granular synthesis algorithm. The quasi-synchronous granular synthesis algorithm is an algorithm that places the grains in a cloud at random intervals. Thus, in contrast to the synchronous granular synthesis algorithm where any delay periods are of a fixed periodic interval, the quasi-synchronous granular synthesis algorithm can create delay periods with random intervals.

Another granular synthesis algorithm is an asynchronous granular synthesis algorithm. The asynchronous granular synthesis algorithm is an algorithm that scatters the grains over a specific duration within a cloud inscribed within a time-frequency plane, rather than placing the grains in a linear timeline within the cloud. The scattering of the grains can be random in time and controlled by stochastic or chaotic algorithms. The scattering of the grains can be dependent on at least one of the following parameters: (1) a start time and duration of the cloud; (2) a grain duration (variable for the duration of the cloud); (3) a density of grains per second (variable for the duration of the cloud); (4) a frequency band of the cloud (usually high and low limits); (5) an amplitude envelope of the cloud; (6) a waveforms within the grains; or (7) a spatial dispersion of the cloud. Because of the random positioning of grains within the cloud, and the random intervals between the grains, the asynchronous granular synthesis algorithm can produce an output that can be perceived as more "organic," or "authentic." The asynchronous granular synthesis algorithm is further described in greater detail in conjunction with FIG. 8.

Other granular synthesis algorithms include physical and algorithm models, and streams and clouds of granulated sounds. More specifically, physical models (such as PhiSEM) can be used to describe a mechanical and acoustical nature of an input, such as audio data. Further, when a window of a recorded input, such as audio data, is segmented into grains, the recorded input has been granulated. The granulation can include a modification of each of the grains in some way, and the grains can then be reassembled to generate an effect, such as a new audio effect.

Figure 7:
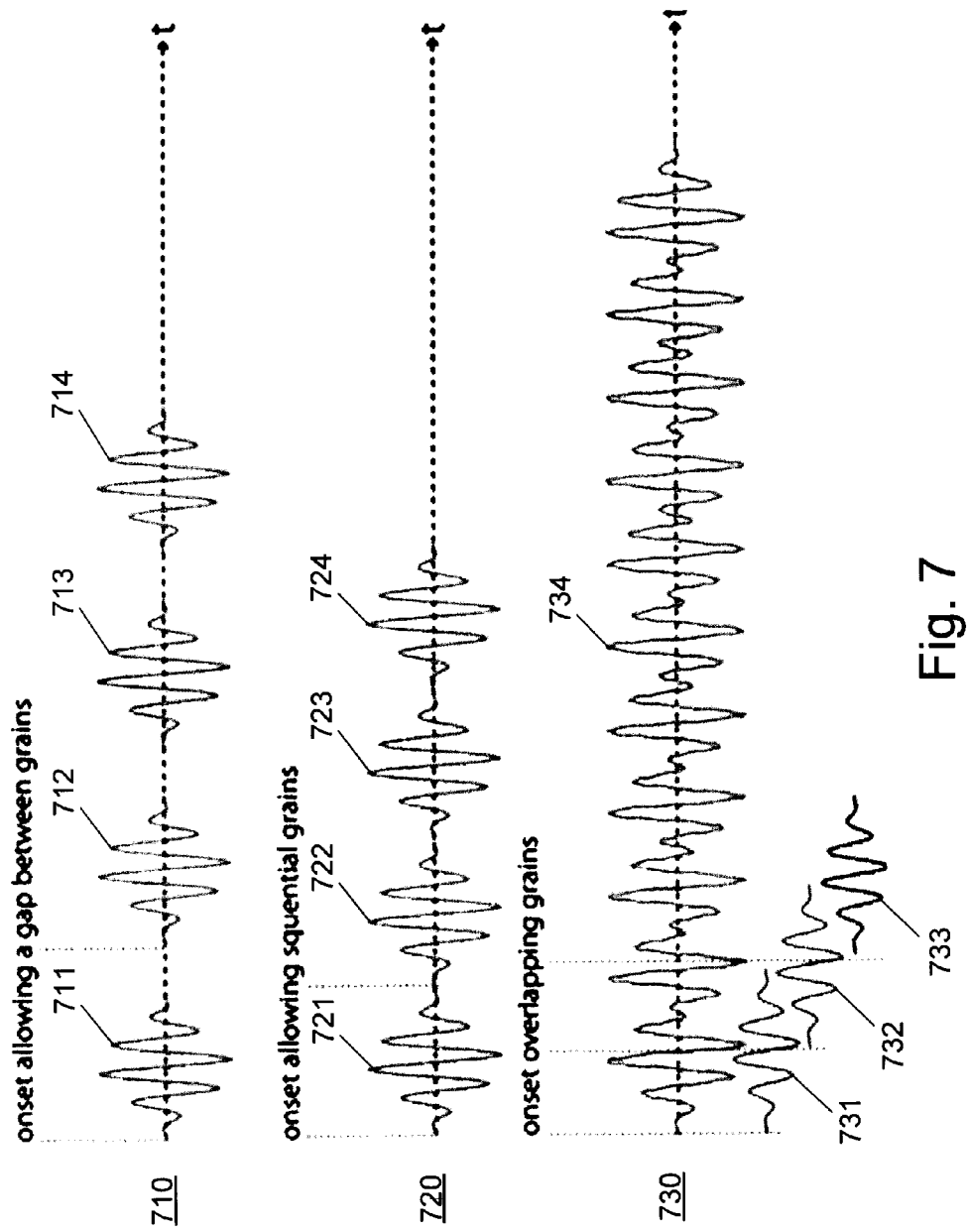
FIG. 7 illustrates different representations of synchronous granular synthesis generation using different grain periodicities, according to an embodiment of the invention.

FIG. 7 illustrates different representations of synchronous granular synthesis generation using different grain periodicities, according to an embodiment of the invention. As previously described, a synchronous granular synthesis algorithm can place grains in a cloud at sequential (i.e., periodic) time locations in a linear timeline within the cloud, with optional delay periods between the grains. FIG. 7 includes representations 710, 720, and 730, which represent different visualizations of a synchronous granular synthesis algorithm. In representation 710, a grain periodicity of the grains (i.e., grains 711, 712, 713, and 714) is set so that a delay period is generated between the grains. More specifically, as illustrated in representation 710 of FIG. 7, grains 711, 712, 713, and 714 are positioned within a timeline t so that there is a delay period between grains 711 and 712, between grains 712 and 713, and between grains 713 and 714.

In representation 720, a grain periodicity of the grains (i.e., grains 721, 722, 723, and 724) is set so that a start time of each grain coincides with an end time of a previous grain. More specifically, as illustrated in representation 720 of FIG. 7, grains 711, 712, 713, and 714 are positioned within a timeline t so that there is no delay period between any of the grains.

In representation 730, a grain periodicity of the grains (i.e., grains 731, 732, and 733) is set so that a start time of each grain occurs before an end time of a previous grain, resulting in overlapping grains, where the overlapping grains result in a superimposed effect (i.e., effect 734). More specifically, as illustrated in representation 720 of FIG. 7, grains 731, 732, and 733 are positioned within a timeline t so that they overlap. The continued overlapping of the grains (including grains 731, 732, and 733, and including additional grains not illustrated in representation 720 of FIG. 7) results in effect 734.

In certain embodiments, the grains used by the synchronous granular synthesis algorithm are constant. More specifically, the parameter values of each grain are constant, and thus, each grain is identical to the other grains. In other embodiments, the grains used by the synchronous granular synthesis algorithm are variable. More specifically, the parameter values of each grain vary, and thus, each grain may be different from the other grains. This can be achieved by setting boundary values (i.e., a range of possible values set by boundaries) for each parameter and then generating a random number that is mapped to the range of possible values set by the boundaries.

Figure 8:
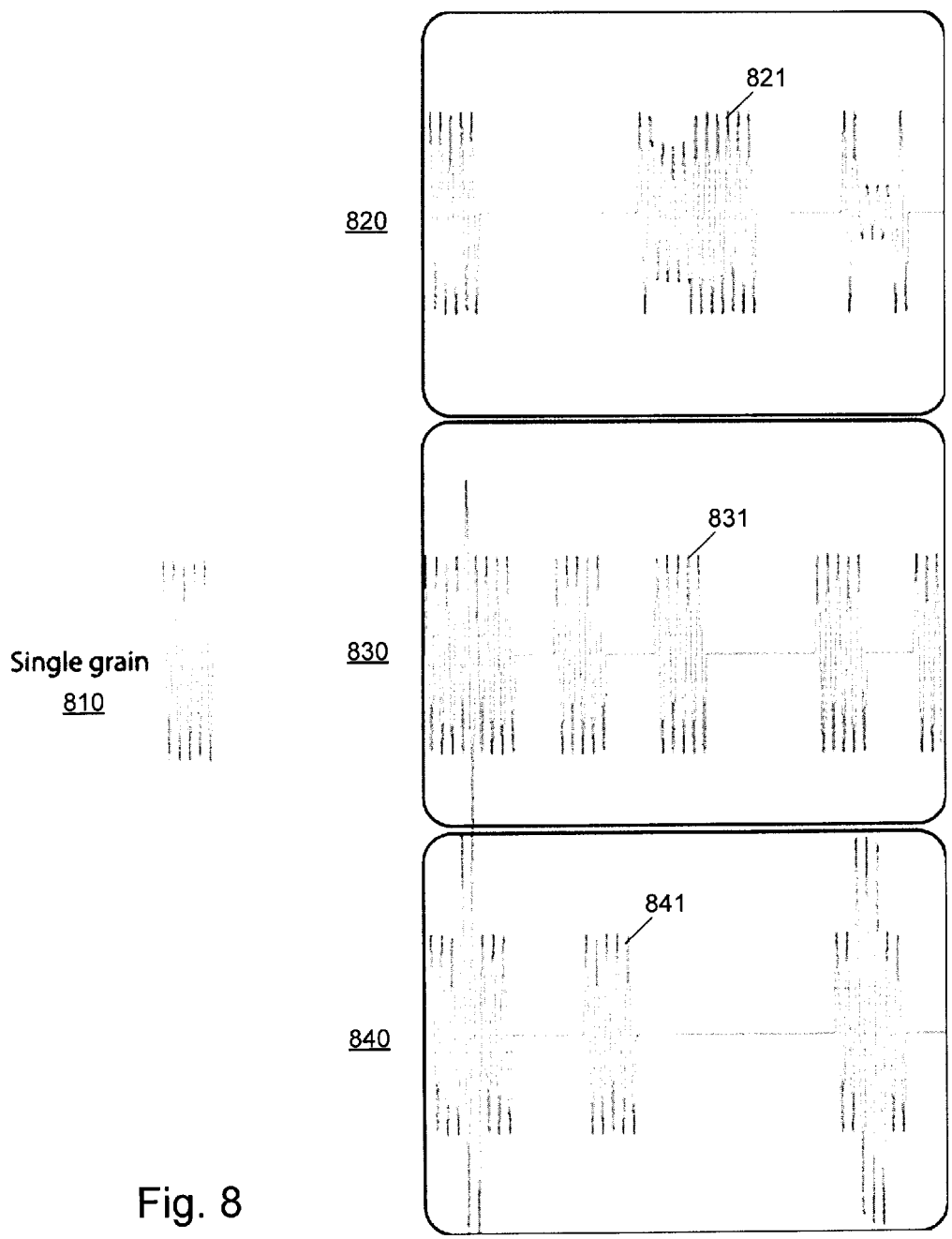
FIG. 8 illustrates different representations of asynchronous granular synthesis generation, according to an embodiment of the invention.

FIG. 8 illustrates different representations of asynchronous granular synthesis generation, according to an embodiment of the invention. As previously described, the asynchronous granular synthesis algorithm is an algorithm that scatters the grains over a specific duration within a cloud inscribed within a time-frequency plane, rather than placing the grains in a linear timeline within the cloud. According to the embodiment, the asynchronous granular synthesis algorithm utilizes a density parameter which can have units of grains per second. For asynchronous granular synthesis implementations, a periodicity to play grains does not exist, and this is why a density parameter is utilized. In the embodiment, a start time for a grain can be computed using the formula: onsetTime=−log(random( ))/Density, where log( ) is a natural logarithm, random( ) is a random generation of a real number between 0 and 1, and Density is a value of a density parameter of a grain.

FIG. 8 includes grain 810, which represents a single grain, and visualizations 820, 830, and 840, which represent different visualizations of an asynchronous granular synthesis algorithm. According to the embodiment, for each of visualizations 820, 830, and 840, a density parameter value is set to 6 grains per second. Further, in visualization 820, grain 810 is distributed in a first random distribution that forms a first superimposed effect (i.e., effect 821). Similarly, in visualization 830, grain 810 is distributed in a second random distribution that forms a second superimposed effect (i.e., effect 831). Likewise, in visualization 840, grain 810 is distributed in a third random distribution that forms a third superimposed effect (i.e., effect 841). Each random distribution is different from the other two random distributions. Effect 821 of visualization 820 is the result of an imposition of a maximum magnitude value. In contrast, effect 831 of visualization 830, and effect 841 of visualization 840, are each the result of a lack of an imposition of a maximum magnitude value.

Figure 9:
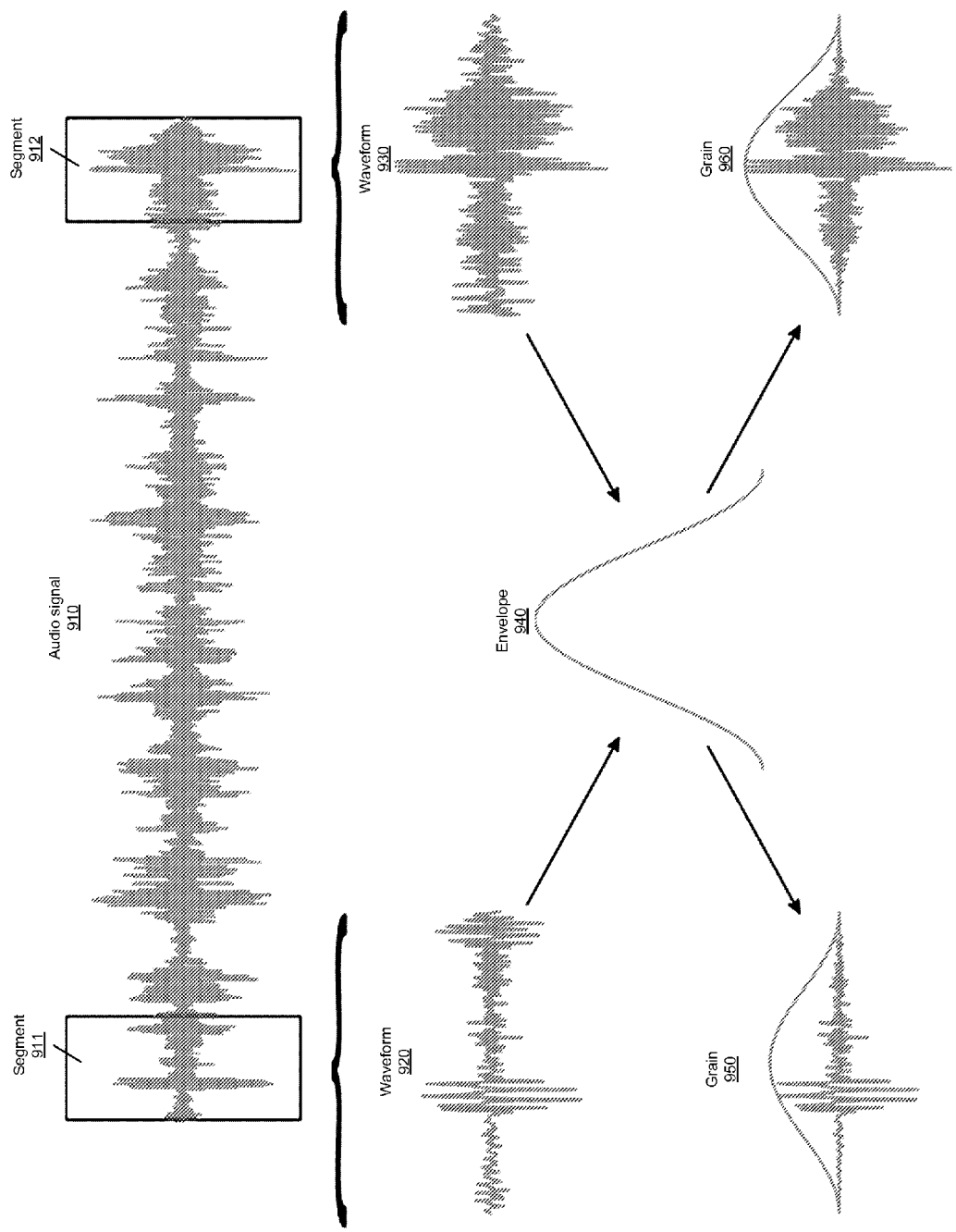
FIG. 9 illustrates a block diagram representation of a granulation algorithm, according to an embodiment of the invention.

FIG. 9 illustrates a block diagram representation of a granulation algorithm, according to an embodiment of the invention. "Granulation" is an algorithm that can be used to extract information from an input, such as audio data, and use that information to create new effects by taking small units of the input as waveforms to generate grains. These grains then can be output directly to a haptic output device, such as an actuator, in order to generate a haptic effect.

According to the embodiment, the granulation algorithm receives audio signal 910, where audio signal 910 includes audio data. In certain embodiments, audio signal 910 can be stored in an audio file. Further, in certain embodiments, audio signal 910 can be encoded in a pulse code modulation ("PCM") format. Audio signal 910 can also be encoded in another type of format, such as a Musical Instrument Digital Interface ("MIDI") format, or a MPEG-2 Audio Layer III ("MP3") format. In these embodiments, audio signal 910 can be decoded into a PCM format.

Further, in alternate embodiments, audio signal 910 can be replaced by another signal, or input, that includes another type of data, such as a video signal that includes video data, an acceleration signal that includes acceleration data, an orientation signal that includes orientation data, an ambient light signal that includes ambient light data, or another type of signal that includes another type of data. An example of another type of a signal is a signal that includes data that can be captured with a sensor. Further, in some embodiments, audio signal 910 can be replaced by a signal that includes multi-modal data (i.e., data of two or more modes, or types, such as audio data and video data).

According to the embodiment, the granulation algorithm segments audio signal 910 into a plurality of segments, illustrated in FIG. 9 as segments 911 and 912. Segments 911 and 912 each include at least a portion of audio signal 910. The granulation algorithm can segment audio signal 910 into any number of segments, and segments 911 and 912 represent an example number of segments. Each segment can define a duration of a grain that is generated from the segment. Further, each segment of the plurality of segments is used as a waveform by the granulation algorithm. Thus, in the illustrated embodiment of FIG. 9, the granulation algorithm uses segment 911 as waveform 920. Further, in the illustrated embodiment of FIG. 9, the granulation algorithm uses segment 912 as waveform 930. Thus, waveforms 920 and 930 each include at least a portion of audio signal 910.

In accordance with the embodiment, for each waveform of the plurality of waveforms, the granulation algorithm combines the waveform with an envelope in order to generate a grain. Thus, the granulation algorithm generates a plurality of grains. In the illustrated embodiment of FIG. 9, the granulation algorithm combines waveform 920 with envelope 940 to generate grain 950. Further, in the illustrated embodiment of FIG. 9, the granulation algorithm combines waveform 930 with envelope 940 to generate grain 960. Grains 950 and 960 represent the plurality of grains generated by the granulation algorithm.

According to the embodiment, the granulation algorithm combines the plurality of grains into a cloud. In certain embodiments, the granulation algorithm can use a synchronous granular synthesis algorithm to combine the grains into the cloud, as previously described in conjunction with FIG. 7. In some of these embodiments, the grains can be positioned at periodic locations within the cloud. Further, in some of these embodiments, there can be a fixed interval between each grain of the plurality of grains. However, in other embodiments, there can be no interval between each grain of the plurality of grains. Further, in other embodiments, the plurality of grains can be overlapping.

In other embodiments, the granulation algorithm can use an asynchronous granular synthesis algorithm to combine the plurality of grains into the cloud, as previously described in conjunction with FIG. 8. In some of these embodiments, the grains can be positioned at random locations within the cloud. Further, in some of these embodiments, there can be a random interval between each grain of the plurality of grains.

In certain embodiments, as an alternative to, or in addition to, combining the plurality of grains into a cloud, the granulation algorithm can utilize an interpolation algorithm in order to interpolate two or more grains of the plurality of grains. Such an interpolation algorithm is further described in greater detail in conjunction with FIGS. 10 and 11.

In certain embodiments, as an alternative to, or in addition to, combining the plurality of grains into a cloud, the granulation algorithm can utilize a spatial granulation algorithm in order to generate at least one grain of the plurality of grains. Such a spatial granulation algorithm is further described in greater detail in conjunction with FIG. 12.

According to the embodiment, the granulation algorithm can send the cloud as a haptic signal to a haptic output device, such as an actuator (not illustrated in FIG. 9). The haptic signal can cause the haptic output device to output a haptic effect, where the haptic effect is based on the cloud created by the granulation algorithm.

In certain embodiments, audio signal 910 can be modified before the granulation algorithm segments audio signal 910. More specifically, audio signal 910 may include frequency content that results in the granulation algorithm producing a haptic effect with a reduced haptic perceptibility, or a haptic effect with a reduced "authentic" quality. In order to increase the haptic perceptibility of the haptic effect that is produced from the granulation algorithm, audio signal 910 may be modified. Such a modification of audio signal can include shifting a frequency of audio signal, increasing a magnitude of audio signal, or some other similar algorithm. Further, such a modification can result in a haptic effect with a more "authentic" feel. Modification of an input, such as audio signal 910, is further described in greater detail in conjunction with FIGS. 14-18.

In certain embodiments, granular synthesis can be used to create a dynamic haptic effect. As previously described, dynamic haptic effects (or dynamic effects) are haptic effects that can be output on a haptic output device, such as an actuator, to represent a change in a state of a given input signal. For example, a position change of a finger on a touchscreen, can be mapped to a haptic effect that varies dynamically as a function of position change, or to a haptic effect triggered by a level of device acceleration. The haptic effect can vary its magnitude, frequency, duration, or any combination of its parameter values. Dynamic haptic effects are further described in U.S. patent application Ser. No. 13/546,351, filed on Jul. 11, 2012, entitled "GENERATING HAPTIC EFFECTS FOR DYNAMIC EVENTS," in U.S. patent application Ser. No. 13/667,003, filed on Nov. 2, 2012, entitled "ENCODING DYNAMIC HAPTIC EFFECTS," and in U.S. patent application Ser. No. 13/709,157, filed on Dec. 10, 2012, entitled "ENHANCED DYNAMIC HAPTIC EFFECTS."

An interpolation algorithm (such as a linear interpolation algorithm) is an algorithm that can interpolate between two key frames (i.e., two predefined periodic effects) based on an input signal normalized between the numeric values of zero and one. The key frames can be defined in a timeline effect which contains a delayed periodic effect with an envelope, where the periodic effect can be repeated overtime. Such an interpolation of key frames to generate a haptic effect is further described in U.S. patent application Ser. No. 13/546,351, filed on Jul. 11, 2012, entitled "GENERATING HAPTIC EFFECTS FOR DYNAMIC EVENTS," in U.S. patent application Ser. No. 13/667,003, filed on Nov. 2, 2012, entitled "ENCODING DYNAMIC HAPTIC EFFECTS," and in U.S. patent application Ser. No. 13/709,157, filed on Dec. 10, 2012, entitled "ENHANCED DYNAMIC HAPTIC EFFECTS."

In the case of granular synthesis, according to an embodiment of the invention, two grains can be pre-defined, and an interpolation algorithm can be used to generate new grains by interpolating between the two pre-defined grains as a function of an input value. Such an interpolation algorithm is further described in greater detail in conjunction with FIG. 10.

Figure 10:
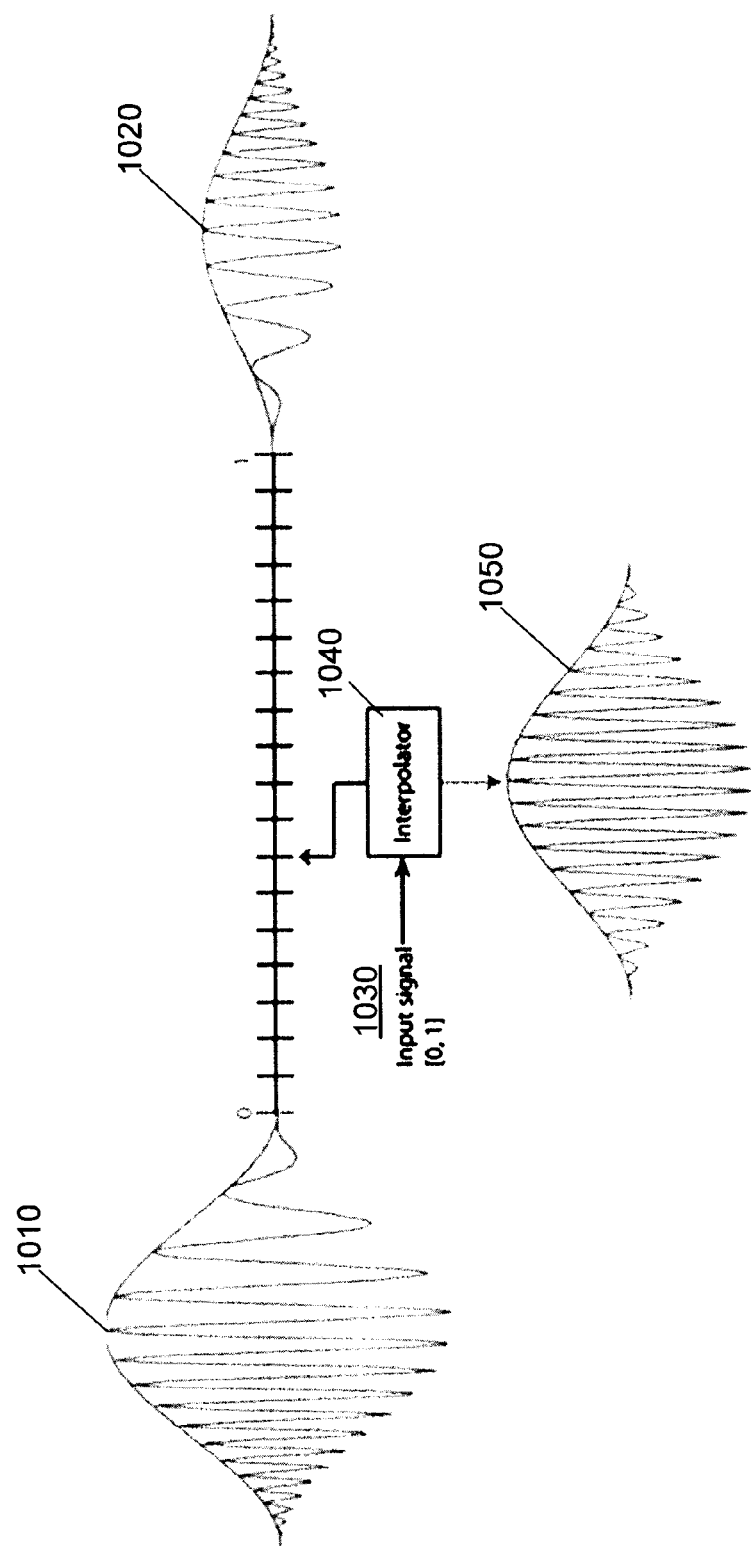
FIG. 10 illustrates a block diagram representation of an interpolation algorithm involving two grains, according to an embodiment of the invention.

FIG. 10 illustrates a block diagram representation of an interpolation algorithm involving two grains, according to an embodiment of the invention. FIG. 10 includes pre-defined grains 1010 and 1020, and further includes an input signal 1030. In one embodiment, input signal 1030 can be an external signal, such as a position signal that indicates a position on a touchscreen, an acceleration signal, a velocity signal, or any type of signal captured by a sensor. Pre-defined grain 1010 is used when input signal 1030 has a numeric value of zero. Pre-defined grain 1010 has a glissando that goes from high to low frequency and uses a maximum magnitude. This can be based on a set of parameters associated with pre-defined grain 1010. Pre-defined grain 1020 is used when input signal 1030 has a numeric value of one. Pre-defined grain 1020 has a glissando that goes from low to high frequency and 40% of the maximum magnitude. This can be based on a set of parameters associated with pre-defined grain 1020. FIG. 10 further includes interpolator 1040. When input signal 1030 has a numeric value between 0 and 1, interpolator 1040 interpolates pre-defined grain 1010 and pre-defined grain 1020 as a function of input signal 1030 to produce grain 1050. Grain 1050 includes an interpolated glissando and magnitude, based on the function of input signal 1030. Thus, grain 1050 is based on set of interpolated parameters, where the interpolated parameters are generated by interpolator 1040 as a function of input signal 1030.

FIG. 11 illustrates example interpolators, according to an embodiment of the invention. FIG. 11 illustrates that different interpolators (i.e., interpolator algorithms) can be used to interpolate two pre-defined grains to generate a new grain. Such example interpolators can include a linear interpolator 1110, a logarithmic interpolator 1120, a circular interpolator 1130, a triangular interpolator 1140, and a random interpolator 1150. Further, according to alternate embodiments, an interpolator can be another type of interpolator not illustrated in FIG. 11.

According to an embodiment, in an interpolation algorithm, such as a linear interpolation algorithm, all parameters of a grain are interpolated by one input value using a unique interpolator. In an alternate embodiment, an enhanced dynamic haptic effect can be utilized. There are three types of enhanced dynamic haptic effect: (a) one input signal with multiple interpolators; (b) multiple input signals with one interpolator; and (c) multiple input signals with multiple interpolators. In the case of one input signal with multiple interpolators, the input signal is applied to different interpolations on different parameters. For example, with an increase of an input signal, a magnitude can increase linearly, a duration can decrease logarithmically, and a frequency can be kept constant. In the case of multiple input signals with one interpolator, a pre-interpolation is performed to transform multiple input signals into one input value. For example, two input signals, such as pressure and velocity, can be used to module a magnitude of a haptic effect generated using granular synthesis. A magnitude can increase with a specific pressure value and can decrease with a specific velocity value. The pre-processing can provide a normal value as an input for interpolation between a minimum and a maximum magnitude. In the case of multiple input signals with multiple interpolators, the previous two algorithms can be combined.

Figure 12:
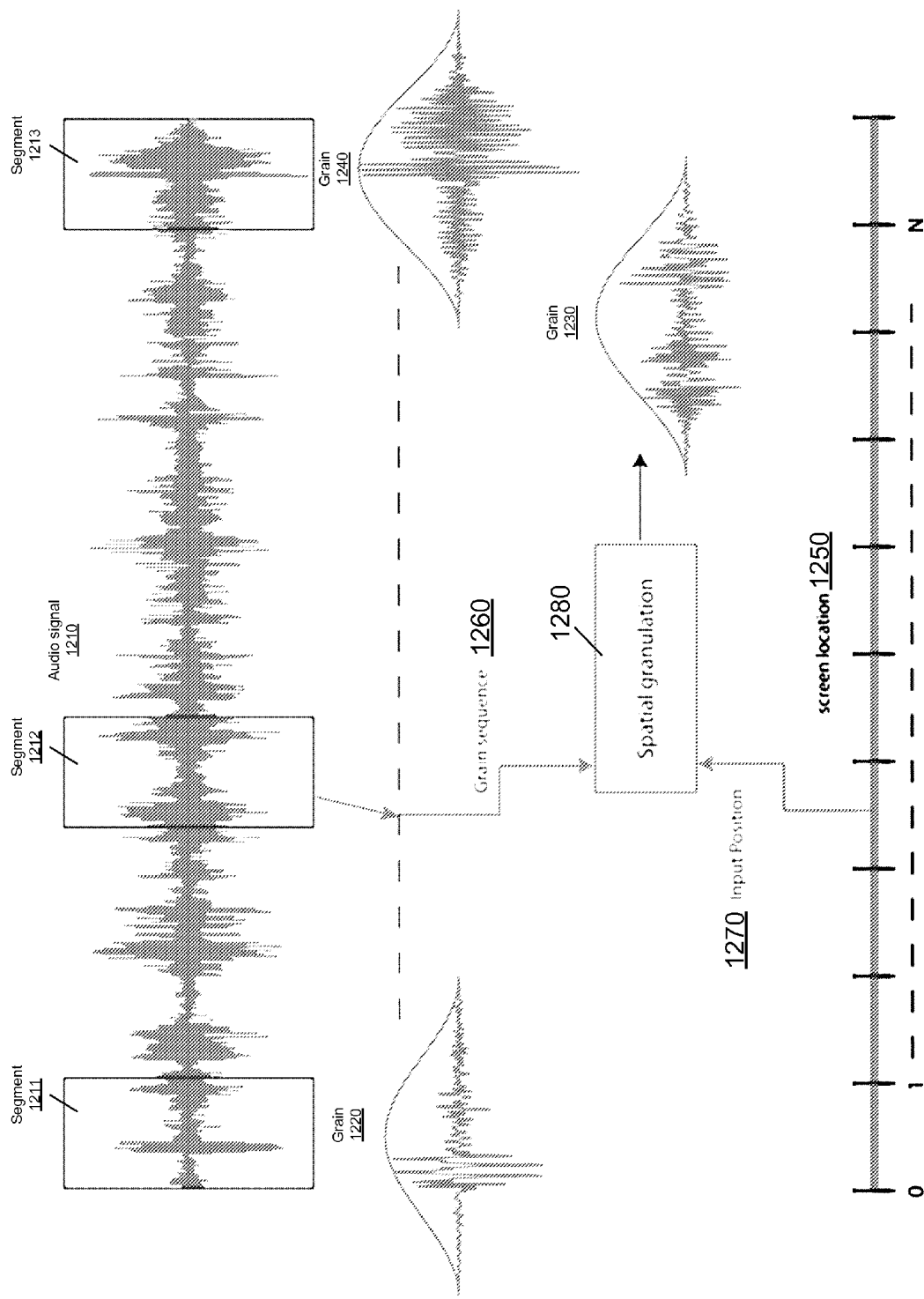
FIG. 12 illustrates a block diagram representation of a spatial granulation algorithm, according to an embodiment of the invention.

FIG. 12 illustrates a block diagram representation of a spatial granulation algorithm, according to an embodiment of the invention. A spatial granulation algorithm is a granulation algorithm that incorporates a mapping of a grain and a position of a screen, such as a touchscreen.

According to the embodiment, the spatial granulation algorithm receives audio signal 1210, where audio signal 1210 includes audio data. In alternate embodiments, audio signal 1210 can be replaced by another signal, or input, that includes another type of data, such as a video signal that includes video data, an acceleration signal that includes acceleration data, an orientation signal that includes orientation data, an ambient light signal that includes ambient light data, or another type of signal that includes another type of data. An example of another type of a signal is a signal that includes data that can be captured with a sensor. Further, in some embodiments, audio signal 1210 can be replaced by a signal that includes multi-modal data (i.e. data of two or more modes, or types, such as audio data and video data).

According to the embodiment, the spatial granulation algorithm segments audio signal 1210 into a plurality of segments, illustrated in FIG. 12 as segments 1211, 1212, and 1213. Segments 1211, 1212, and 1213 each include at least a portion of audio signal 1210. The spatial granulation algorithm can segment audio signal 1210 into any number of segments, and segments 1211, 1212, and 1213 represent an example number of segments. The spatial granulation algorithm further generates a plurality of grains based on the plurality of segments. Thus, according to the illustrated embodiment, the spatial granulation algorithm generates grain 1220 based on segment 1211, grain 1230 based on segment 1212, and grain 1240 based on segment 1213. According to the embodiment, the generation of at least one grain of the plurality of grains is triggered based on an input at a position of a screen, such as a touchscreen. Such a generation is further described below in greater detail in conjunction with the generation of grain 1230.

According to the embodiment, a screen, such a touchscreen, can be segmented into a specific number of pixels in width, where each pixel represents a position within the screen. This is illustrated in FIG. 12 as screen location 1250. Similarly, the plurality of grains can be organized within a grain sequence, where each grain has a position within the grain sequence. This is illustrated in FIG. 12 as grain sequence 1260. Thus, each grain can be mapped to a position within the screen. According to the embodiment, the spatial granulation algorithm detects an input at a position of the screen that corresponds to a position of grain 1230 within grain sequence 1260 (i.e., detects an input at a position of the screen mapped to grain 1230). The spatial granulation algorithm receives the detected input (illustrated in FIG. 12 as input position 1270) at spatial granulation 1280, and the spatial granulation algorithm subsequently generates grain 1230 based on segment 1212 in accordance with the granulation algorithm described in conjunction with FIG. 9.

Figure 13:
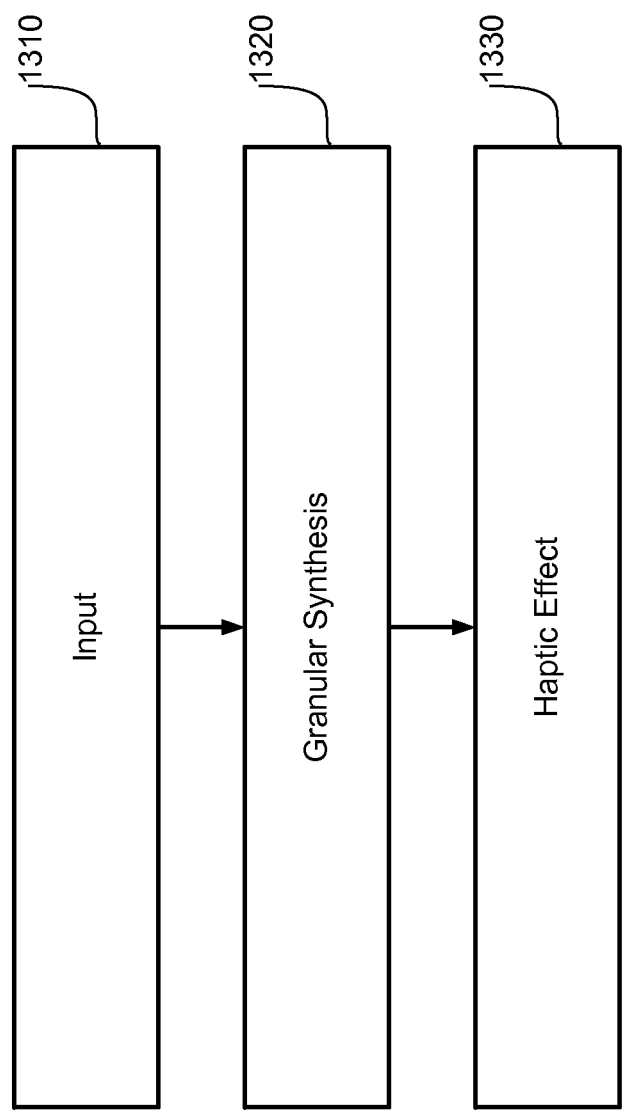
FIG. 13 illustrates a flow diagram of a haptic conversion algorithm that utilizes granular synthesis, according to an embodiment of the invention.

FIG. 13 illustrates a flow diagram of a haptic conversion algorithm, according to an embodiment of the invention. In one embodiment, the functionality of FIG. 13, as well as the functionality of FIG. 19, the functionality of FIG. 20, and the functionality of FIG. 21, are each implemented by software stored in memory or another computer-readable or tangible medium, and executed by a processor. In other embodiments, each functionality may be performed by hardware (e.g., through the use of an ASIC, a programmable gate array ("PGA"), a field programmable gate array ("FPGA"), etc.), or any combination of hardware and software. Furthermore, in alternate embodiments, each functionality may be performed by hardware using analog components. In certain embodiments, the functionality of FIG. 13 can be implemented by a haptic conversion module (such as haptic conversion module 16 of FIG. 1).

The flow begins and proceeds to 1310. At 1310, an input is received. In certain embodiments, the input can include audio data. The audio data can be encoded in a PCM format. The audio data can be stored in an audio file or an audio signal. In other embodiments, the input can include video data. In yet other embodiments, the input can include at least one of: image data, text data, or acceleration data. In an alternate embodiment, one or more parameters are received in place of an input. The flow proceeds to 1320.

At 1320, a granular synthesis algorithm is applied to the input. In certain embodiments, through the application of the granular synthesis algorithm, the input is segmented into multiple waveforms, where each waveform includes at least a portion of the input. Each waveform is further combined with an envelope to generate a grain, where a plurality of grains generated through the application of the granular synthesis algorithm. Each grain includes an amplitude parameter, a waveform parameter, an envelope parameter, and a duration parameter. Each grain also optionally includes a density parameter. The grains are further combined through the application of the granular synthesis algorithm to generate a cloud, where the cloud is a representation of the plurality of grains. In an alternate embodiment, each waveform is generated based on at least one parameter of the one or more received parameters.

In certain embodiments, the granular synthesis algorithm is a synchronous granular synthesis algorithm. In these embodiments, the grains can be positioned at periodic locations within the cloud. There can be a fixed interval between each grain of the plurality of grains. Alternatively, there can be no interval between each grain of the plurality of grains. Alternatively, the grains can be overlapping. In alternate embodiments, the granular synthesis algorithm is an asynchronous granular synthesis algorithm. In these embodiments, the grains can be positioned at random locations within the cloud. There can be a random interval between each grain of the plurality of grains.

In certain embodiments, the granular synthesis algorithm utilizes an interpolation algorithm. In these embodiments, using the interpolation algorithm, a first grain and second grain of the plurality of grains can be interpolated. Further, in certain embodiments, the granular synthesis algorithm utilizes a spatial granulation algorithm. In these embodiments, each grain of the plurality of grains is mapped to a position of a touchscreen, and the generation of at least one grain of the plurality of grains is triggered by an input at the corresponding position of the touchscreen. The flow then proceeds to 1330.

At 1330, one or more haptic effects are generated. In certain embodiments, a haptic signal is generated based on the cloud. In these embodiments, the haptic signal is further sent to a haptic output device to generate the one or more haptic effects. In some of these embodiments, the haptic output device is an actuator. In certain embodiments, a plurality of haptic signals is generated based on the cloud. In these embodiments, the plurality of haptic signals is sent to a plurality of haptic output devices to generate the one or more haptic effects. The flow then ends.

In certain embodiments, an input, such as audio data, video data, text data, acceleration data, or another type of signal data, can be modified before a granular synthesis algorithm is applied to the input. Such a modification can involve applying a frequency-shifting algorithm to the input. A frequency-shifting algorithm can shift a frequency content of an input from an original frequency range to a more haptically perceptible frequency range (such as a frequency range greater than or equal to 0 kilohertz ("kHz"), but less than 1 kHz). In alternate embodiments, a pitch-shifting algorithm can be used in place of a frequency-shifting algorithm. In both frequency-shifting and pitch-shifting, a frequency content is modified. However, in frequency-shifting, harmonic relationships between frequencies of signal components are not maintained, whereas, in pitch-shifting, harmonic relationships between frequencies of signal components are maintained. Further, in certain embodiments, the modification of the input can also involve applying a filtering algorithm to the input, which filters the input using a filter. In some of these embodiments, the filtering algorithm can be a high-pass filtering algorithm that high-pass filters the input using a high-pass filter. A granular synthesis algorithm can then be applied to the modified input, as previously described. By modifying the input before applying the granular synthesis algorithm, a higher quality of haptic effect can be output.

Two frequency-shifting algorithms that can be used to shift a frequency content of an input are now described in greater detail. In the first frequency-shifting algorithm, according to one embodiment, a fast Fourier transform is executed on the input. The input is then overlapped in a frequency domain. The input is then converted back into a time domain. The first frequency-shifting algorithm can be replaced by a first pitch-shifting algorithm, where the first pitch-shifting algorithm performs identical operations as described in relation to the first frequency-shifting algorithm.

In the second frequency-shifting algorithm, in one embodiment, a fast Fourier transform is executed on the input. A magnitude of the input is then increased in a frequency domain. The input is then converted back into a time domain.

In an alternate embodiment, similar to the previous embodiment, a fast Fourier transform is executed on the input in the second frequency-shifting algorithm. However, in this alternate embodiment, at least one frequency that is in a specified range is subsequently identified. Such a specified range can be a haptically perceptible range, such as 0-500 Hz. A desired haptic output is then determined, where the desired haptic output can take the format of a desired haptic output mode. At least one appropriate weight is then determined based on the at least one identified frequency. The at least one appropriate weight can further be determined based on the desired haptic output. A signal of the at least one identified frequency is then magnified using the at least one appropriate weight. The magnification can include different weights for different frequencies. Further, the magnification can be based on the desired haptic output. The input is then converted back into a time domain.

The second frequency-shifting algorithm can be replaced by a second pitch-shifting algorithm, where the second pitch-shifting algorithm performs identical operations as described in relation to the second frequency-shifting algorithm. Further, the first and second frequency-shifting algorithms are alternate frequency-shifting algorithms, and either the first frequency-shifting algorithm or the second frequency-shifting algorithm can be used to shift a frequency content of an input.

Figure 14:
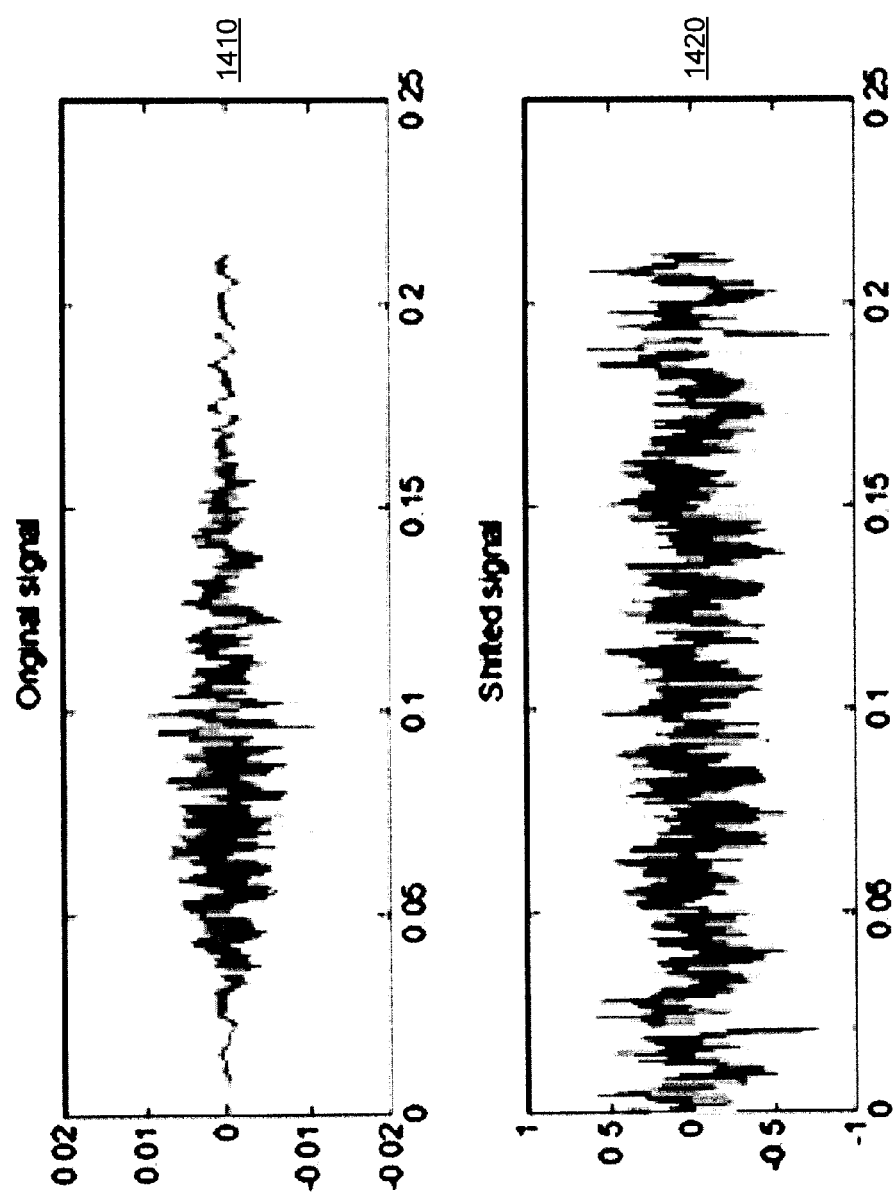
FIG. 14 illustrates a comparison of an original input signal and a frequency-shifted signal, according to an embodiment of the invention.

FIG. 14 illustrates a comparison of an original input signal and a frequency-shifted signal, according to an embodiment of the invention. More specifically, FIG. 14 includes graphs 1410 and 1420. Graph 1410 is a graph of an original input signal, where an x-axis represents a period of time in seconds, and a y-axis represents a normalized magnitude. Graph 1420 is a graph of a frequency-shifted signal, where an x-axis represents a period of time in seconds, and a y-axis represents a normalized magnitude. As illustrated in graph 1410 of FIG. 14, the amplitude is zero or near-zero at the beginning and the end of the original signal, and thus, is not constant throughout the original signal. This can result in the generation of grains with small values. In contrast, as illustrated in graph 1420 of FIG. 14, the amplitude is substantially constant throughout the frequency-shifted signal. This can result in the generation of grains, where each grain is generated with substantial values.

Figure 15:
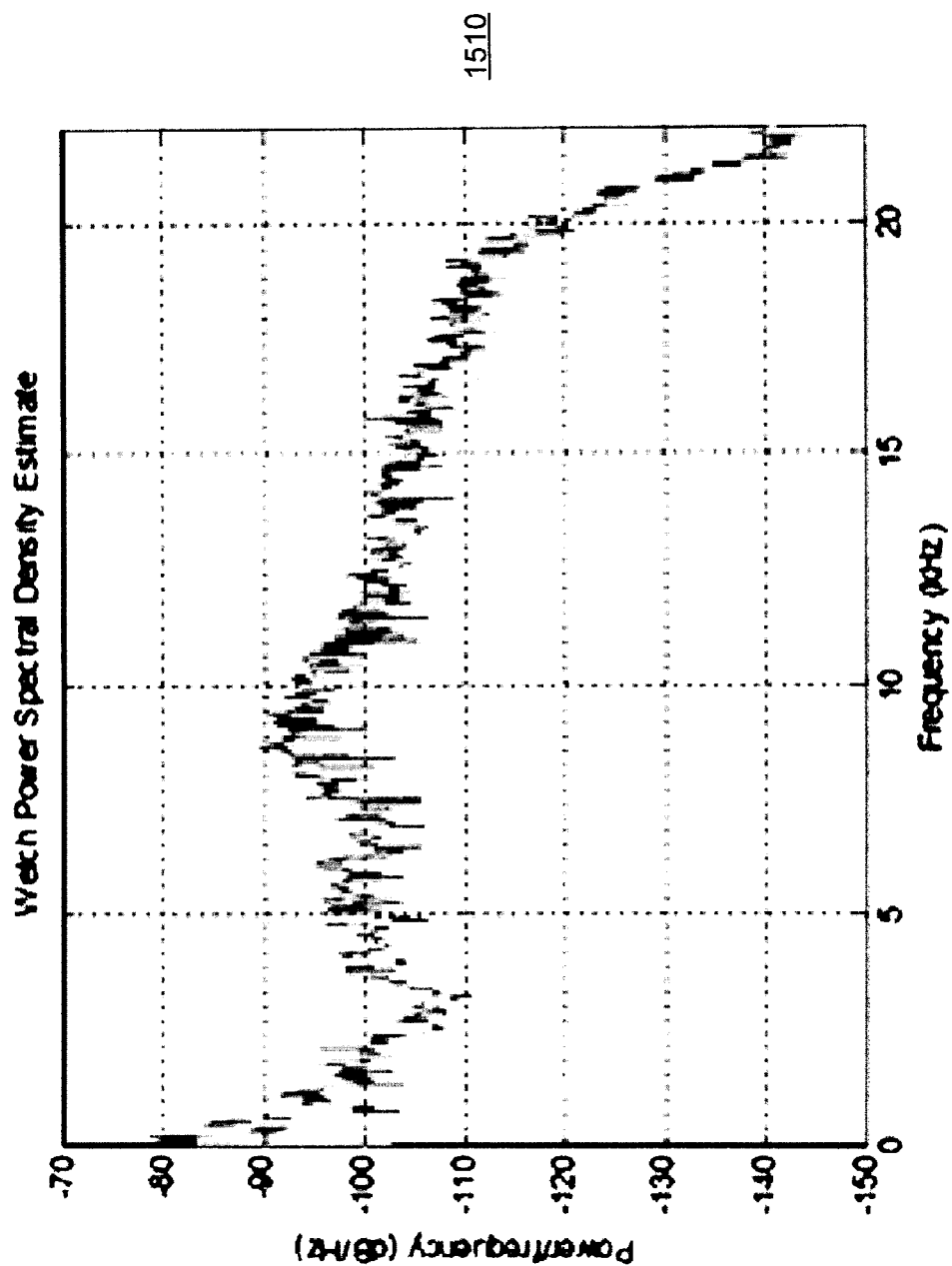
FIG. 15 illustrates a power spectrum of an original input signal, according to an embodiment of the invention.

FIG. 15 illustrates a power spectrum of an original input signal, according to an embodiment of the invention. More specifically, FIG. 15 includes graph 1510. Graph 1510 illustrates a power spectrum of the original input signal, and specifically identifies a location of power that the frequencies have in the original input signal. As illustrated in graph 1510, the power is substantially located in the 0 to 10 kHz frequency range.

Figure 16:
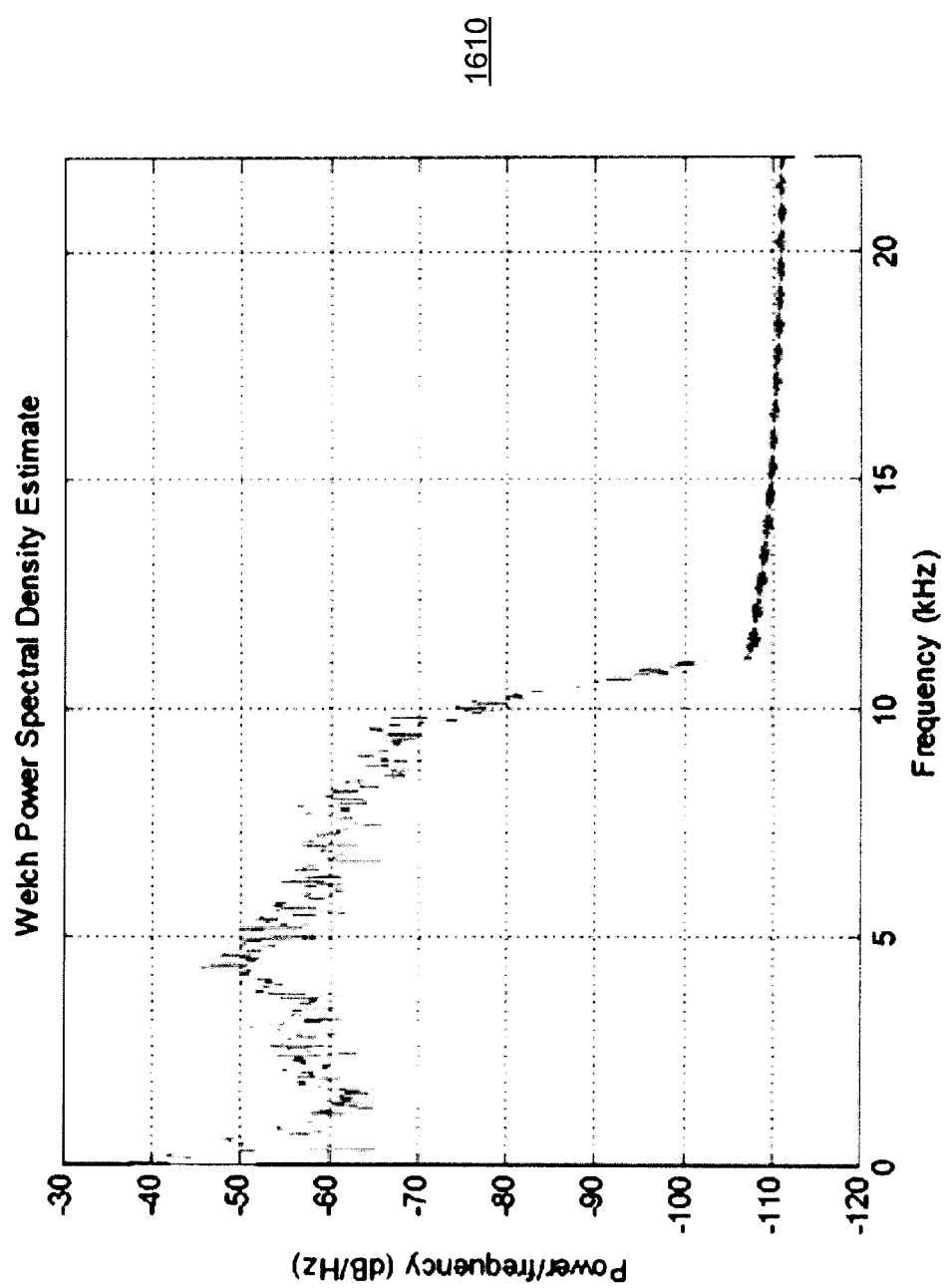
FIG. 16 illustrates a power spectrum of a frequency-shifted signal, according to an embodiment of the invention.

FIG. 16 illustrates a power spectrum of a frequency-shifted signal, according to an embodiment of the invention. More specifically, FIG. 16 includes graph 1610. Graph 1610 illustrates a power spectrum of the frequency-shifted signal, and specifically identifies a location of power that the frequencies have in the frequency-shifted signal. As illustrated in graph 1610, the power is substantially located in the 0 to 5 kHz frequency range. Thus the power has been compressed from the 0 to 10 kHz frequency range to the 0 to 5 kHz range due to the frequency-shifting of the signal.

Figure 17:
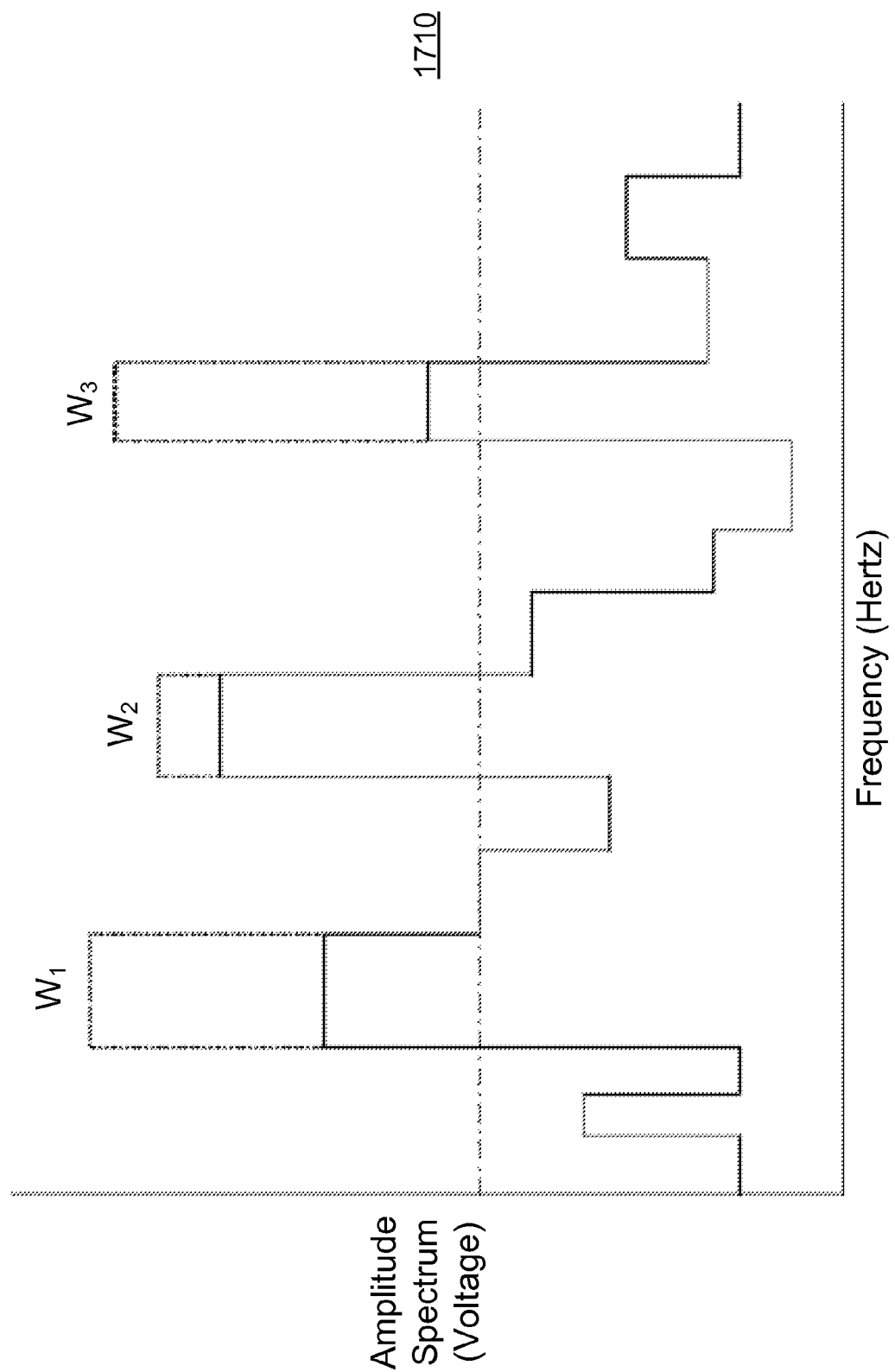
FIG. 17 illustrates a representation of a frequency-shifting algorithm using a plurality of weights to magnify a signal, according to an embodiment of the invention.

FIG. 17 illustrates a representation of a frequency-shifting algorithm using a plurality of weights to magnify a signal, according to an embodiment of the invention. According to the embodiment, FIG. 17 is an example of the second frequency-shifting algorithm. FIG. 17 includes graph 1710. The x-axis of graph 1710 represents a frequency of the signal, in hertz. The y-axis of graph 1710 represents a magnitude (i.e., an absolute value of an amplitude spectrum), in voltage. $W_1$ represents a first weight that is applied to a first frequency to magnify an amplitude of the first frequency. $W_2$ represents a second weight that is applied to a second frequency to magnify an amplitude of the second frequency. $W_3$ represents a third weight that is applied to a third frequency to magnify an amplitude of the third frequency.

Figure 18:
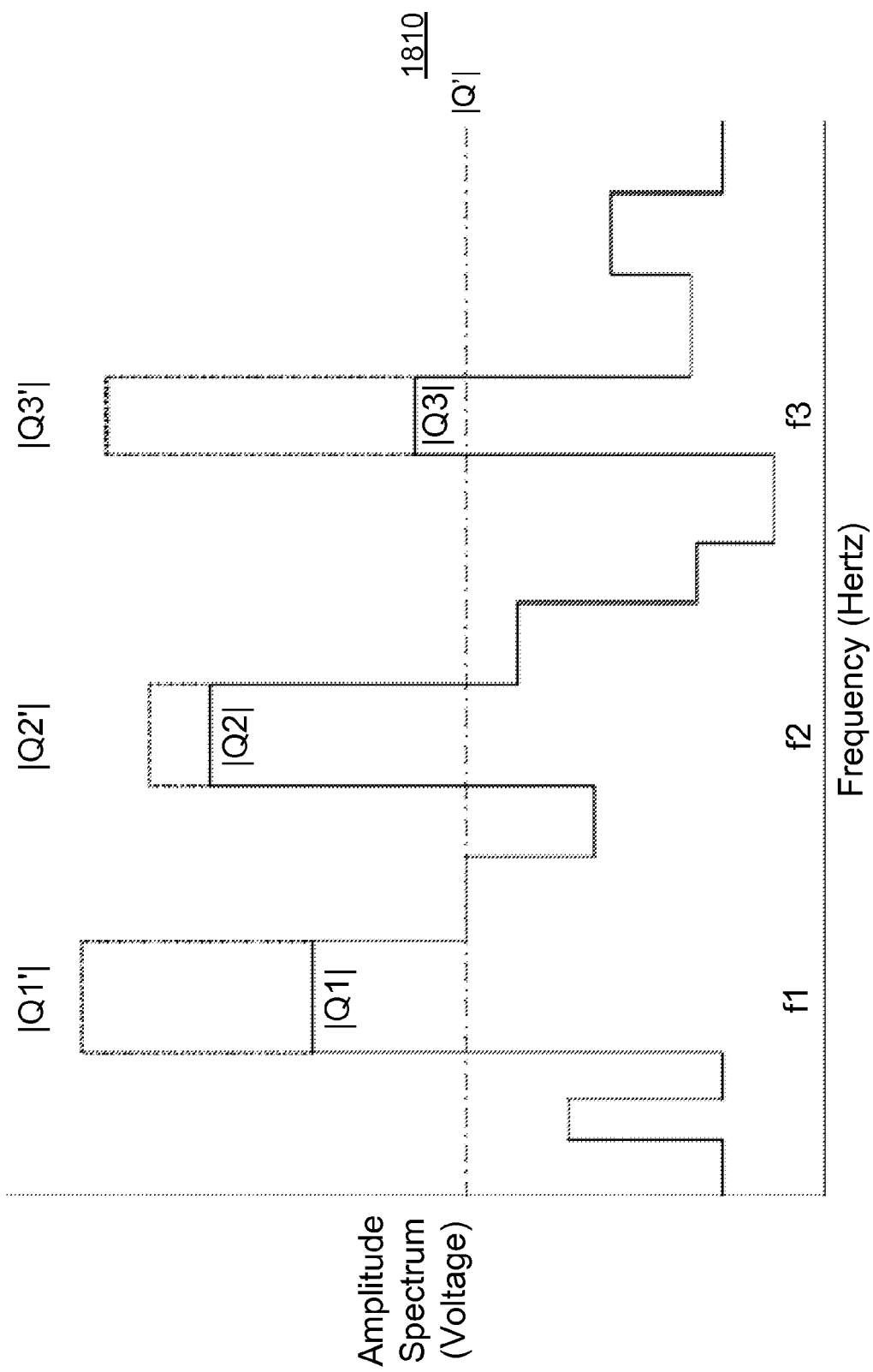
FIG. 18 illustrated another representation of a frequency-shifting algorithm using a plurality of weights to magnify a signal, according to an embodiment of the invention.

FIG. 18 illustrated another representation of a frequency-shifting algorithm using a plurality of weights to magnify a signal, according to an embodiment of the invention. According to the embodiment, FIG. 18 is also an example of the second frequency-shifting algorithm. FIG. 18 includes graph 1810. The x-axis of graph 1810 represents a frequency of the signal, in hertz. The y-axis of graph 1810 represents a magnitude (i.e., an absolute value of an amplitude spectrum), in voltage.

According to the embodiment, a signal can first be captured in terms of voltage v versus time t. Thus, the signal can be represented as a function of voltage versus time, or v=q(t). A fast Fourier transform can be executed on q(t), taking the signal to a frequency domain. An example of a resulting signal after the fast Fourier transform is the signal shown in graph 1810. One or more frequency components that are within a haptically perceptible range can be identified. In the illustrated embodiment, these identified frequency components are identified as frequency components f1, f2, and f3. Further, an original amplitude associated with frequency components f1, f2, and f3 are identified as |Q1|, |Q2|, and |Q3|. It should be understood that frequency components f1, f2, and f3 are merely example frequency ranges that are identified as haptically perceptible ranges for purposes of illustration of the embodiment, and do not delineate specific frequency ranges. An example frequency range that has been identified as a haptically perceptible range is a range of 0-500 Hz.

According to the embodiment, the amplitudes |Q1|, |Q2|, and |Q3| that are associated with f1, f2, and f3 are magnified in a frequency domain with different factors selected based on a desired haptic output, such as haptic strength. The magnified updates associated with these frequencies are identified as |Q'1|, |Q'2|, and |Q'3|. Further, an updated amplitude spectrum function (in frequency domain), after making the aforementioned modifications, is identified as |Q'|, which is also illustrated in FIG. 18 as a dotted line.

According to the embodiment, |Q'| is converted from a frequency domain to a time domain, and identified as v'=q'(t). Signal q'(t) can then be used as an input to a granular synthesis algorithm to generate a haptic signal as previously described.

Figure 19:
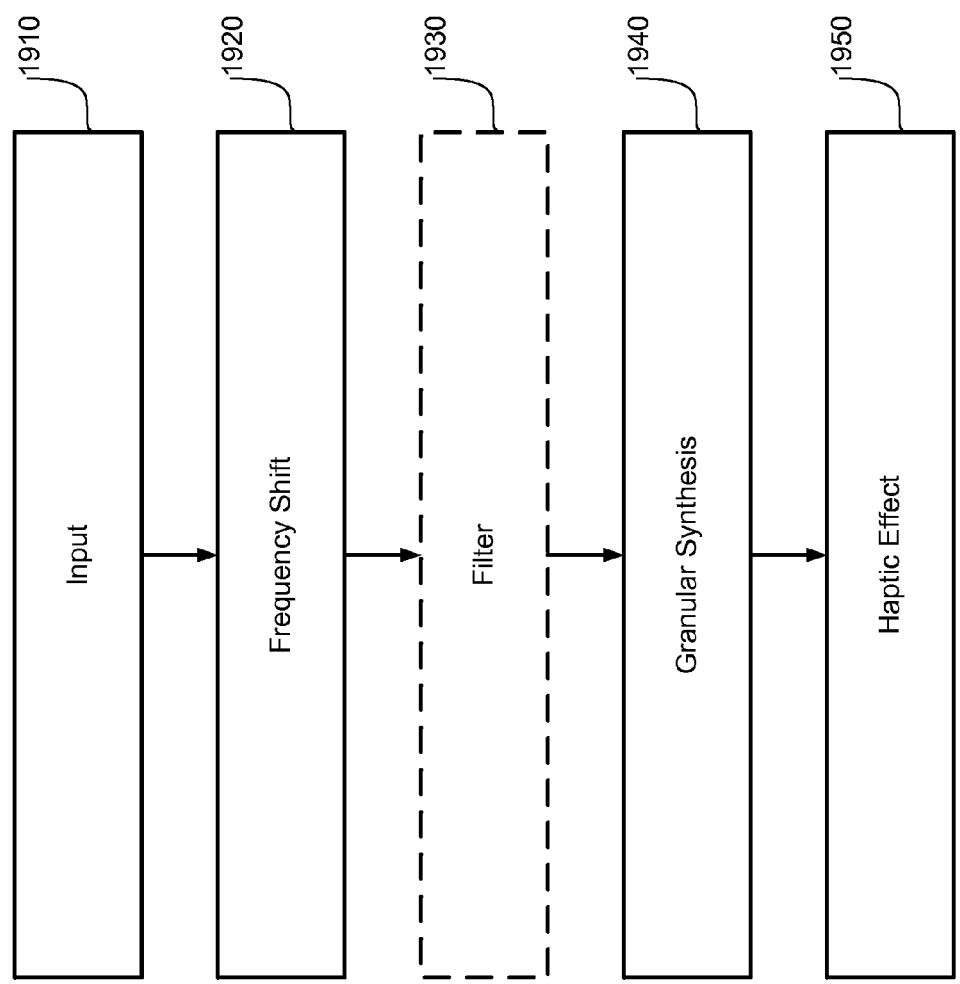
FIG. 19 illustrates a flow diagram of an enhanced haptic conversion algorithm that utilizes granular synthesis, according to an embodiment of the invention.

FIG. 19 illustrates a flow diagram of an enhanced haptic conversion algorithm that utilizes granular synthesis, according to an embodiment of the invention. In certain embodiments, the functionality of FIG. 19 can be implemented by a haptic conversion module (such as haptic conversion module 16 of FIG. 1).

The flow begins and proceeds to 1910. At 1910, an input is received. In certain embodiments, the input can include audio data. The audio data can be encoded in a PCM format. The audio data can be stored in an audio file or an audio signal. In other embodiments, the input can include video data. In yet other embodiments, the input can include at least one of: image data, text data, or acceleration data. In an alternate embodiment, one or more parameters are received in place of an input. The flow proceeds to 1920.

At 1920, a frequency of the input is shifted. In certain embodiments, as part of the shifting of the frequency of the input, a fast Fourier transform can be executed on the input. In some of these embodiments, the input can be overlapped in a frequency domain. In alternate embodiments, at least one frequency of the input that is in a specified range can be identified. A desired haptic output can further be determined, and at least one weight can be applied to the at least one frequency based on the desired haptic output in order to magnify an amplitude of the at least one frequency. The input can then be converted back into a time domain. The flow then proceeds to 1930.

At 1930, the input is optionally filtered. In certain embodiments, the input can be high-pass filtered using a high-pass filter. The flow proceeds to 1940.

At 1940, a granular synthesis algorithm is applied to the input. In certain embodiments, through the application of the granular synthesis algorithm, the input is segmented into multiple waveforms, where each waveform includes at least a portion of the input. Each waveform is further combined with an envelope to generate a grain, where multiple grains are generated through the application of the granular synthesis algorithm. Each grain includes an amplitude parameter, a waveform parameter, an envelope parameter, and a duration parameter. Each grain also optionally includes a density parameter. The grains are further combined through the application of the granular synthesis algorithm to generate a cloud, where the cloud is a representation of the plurality of grains. In an alternate embodiment, each waveform is generated based on at least one parameter of the one or more received parameters.

In certain embodiments, the granular synthesis algorithm is a synchronous granular synthesis algorithm. In these embodiments, the grains can be positioned at periodic locations within the cloud. There can be a fixed interval between each grain of the plurality of grains. Alternatively, there can be no interval between each grain of the plurality of grains. Alternatively, the grains can be overlapping. In alternate embodiments, the granular synthesis algorithm is an asynchronous granular synthesis algorithm. In these embodiments, the grains can be positioned at random locations within the cloud. There can be a random interval between each grain of the plurality of grains.

In certain embodiments, the granular synthesis algorithm utilizes an interpolation algorithm. In these embodiments, using the interpolation algorithm, a first grain and second grain of the plurality of grains can be interpolated. Further, in certain embodiments, the granular synthesis algorithm utilizes a spatial granulation algorithm. In these embodiments, each grain of the plurality of grains is mapped to a position of a touchscreen, and the generation of at least one grain of the plurality of grains is triggered by an input at the corresponding position of the touchscreen. The flow then proceeds to 1950.

At 1950, one or more haptic effects are generated. In certain embodiments, a haptic signal is generated based on the cloud. In these embodiments, the haptic signal is further sent to a haptic output device to generate the one or more haptic effects. In some of these embodiments, the haptic output device is an actuator. In certain embodiments, a plurality of haptic signals is generated. In these embodiments, the plurality of haptic signals is sent to a plurality of haptic output devices to generate the one or more haptic effects. The flow then ends.

Figure 20:
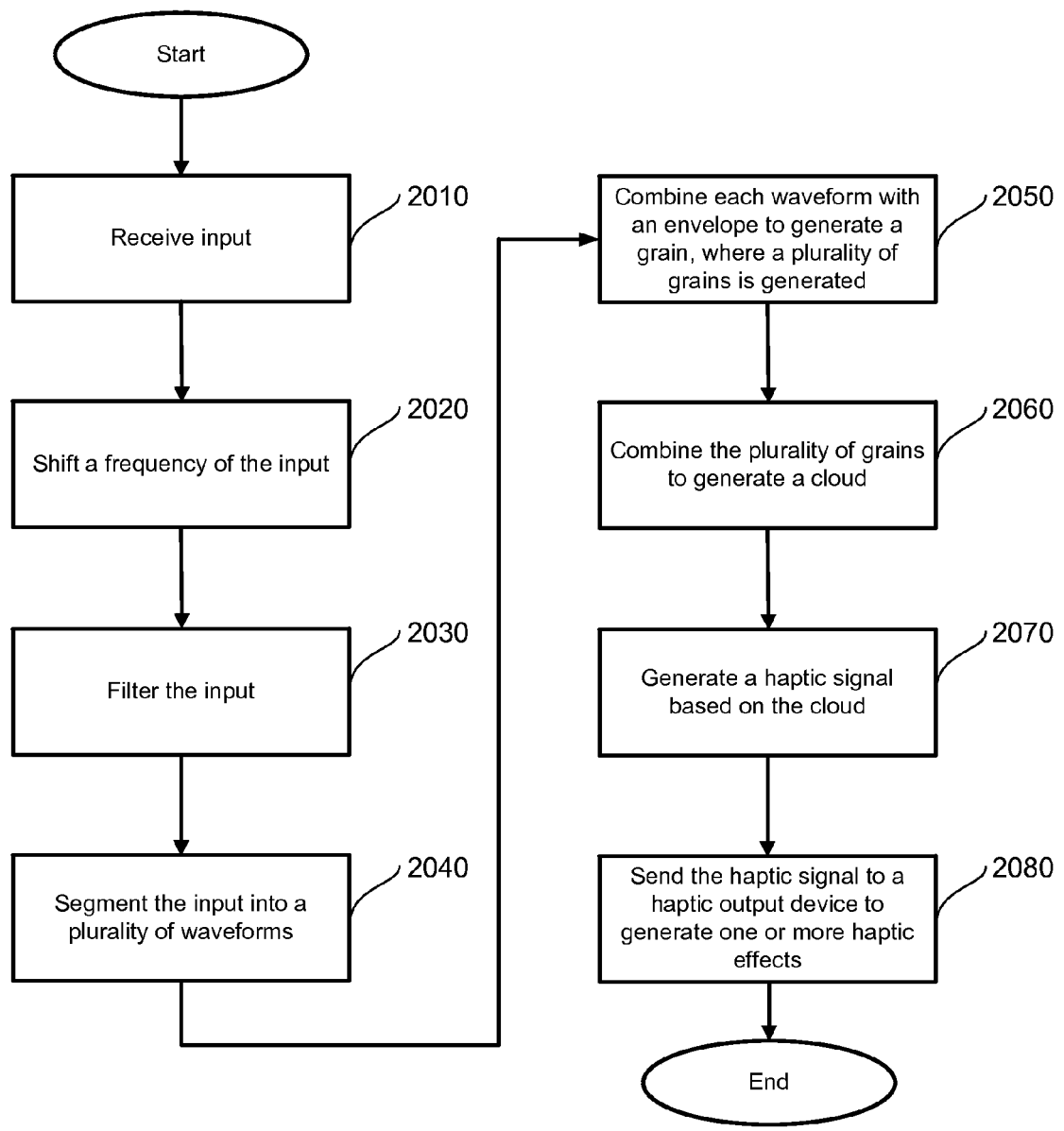
FIG. 20 illustrates a flow diagram of the functionality of a haptic conversion module, according to one embodiment of the invention.
Figure 21:
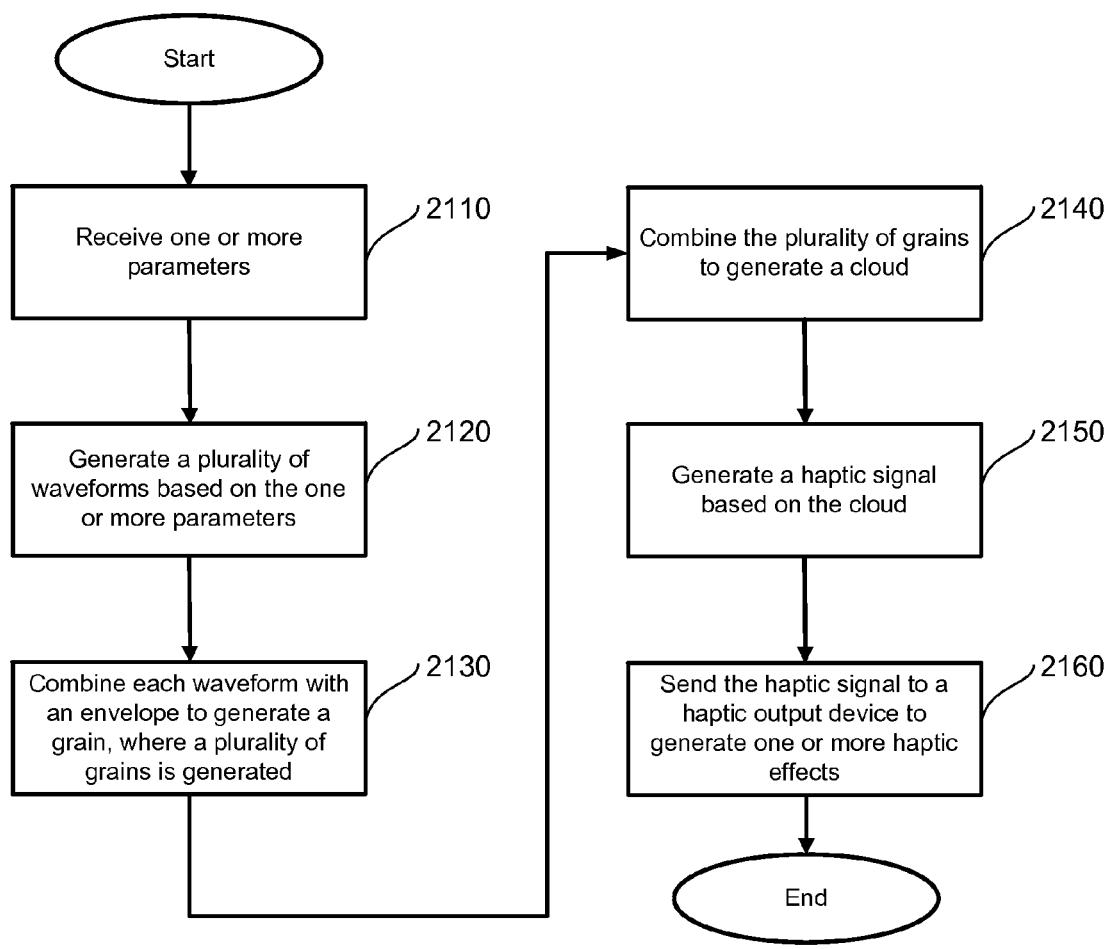
FIG. 21 illustrates another flow diagram of the functionality of a haptic conversion module, according to another embodiment of the invention.

FIG. 20 illustrates a flow diagram of the functionality of a haptic conversion module (such as haptic conversion module 16 of FIG. 1), according to one embodiment of the invention. The flow begins and proceeds to 2010. At 2010, an input is received. In certain embodiments, the input can include audio data. The audio data can be encoded in a PCM format. The audio data can be stored in an audio file or an audio signal. In other embodiments, the input can include video data. In yet other embodiments, the input can include at least one of: image data, text data, or acceleration data. The flow proceeds to 2020.

At 2020, a frequency of the input is shifted. In certain embodiments, as part of the shifting of the frequency of the input, a fast Fourier transform can be executed on the input. In some of these embodiments, the input can be overlapped in a frequency domain. In alternate embodiments, at least one frequency of the input that is in a specified range can be identified. A desired haptic output can further be determined, and at least one weight can be applied to the at least one frequency based on the desired haptic output in order to magnify an amplitude of the at least one frequency. The input can then be converted back into a time domain. In certain embodiments, 2020 can be omitted. The flow proceeds to 2030.

At 2030, the input is optionally filtered. In certain embodiments, the input can be high-pass filtered using a high-pass filter. In certain embodiments, 2030 is omitted. The flow proceeds to 2040.

At 2040, the input is segmented into a plurality of waveforms, where each waveform includes at least a portion of the input. The flow proceeds to 2050.

At 2050, each waveform is combined with an envelope to generate a grain, where a plurality of grains is generated. Each grain includes an amplitude parameter, a waveform parameter, an envelope parameter, and a duration parameter. Each grain also optionally includes a density parameter. The flow proceeds to 2060.

At 2060, the grains are combined to generate a cloud, where the cloud is a representation of the plurality of grains. In certain embodiments, the grains can be positioned at periodic locations within the cloud. There can be a fixed interval between each grain of the plurality of grains. Alternatively, there can be no interval between each grain of the plurality of grains. Alternatively, the grains can be overlapping. In alternate embodiments, the grains can be positioned at random locations within the cloud. There can be a random interval between each grain of the plurality of grains. In certain embodiments, a first grain and second grain of the plurality of grains can be interpolated. Further, in certain embodiments, each grain of the plurality of grains is mapped to a signal value, such as a position of a touchscreen, and the generation of at least one grain of the plurality of grains is triggered by a signal that includes the signal value, such as an input at the corresponding position of the touchscreen. The flow proceeds to 2070.

At 2070, a haptic signal is generated based on the cloud. In certain embodiments, a plurality of haptic signals is generated based on the cloud. The flow proceeds to 2080.

At 2080, the haptic signal is further sent to a haptic output device to generate the one or more haptic effects. In some of these embodiments, the haptic output device is an actuator. In embodiments where a plurality of haptic signals is generated, the plurality of haptic signals is sent to a plurality of haptic output devices to generate the one or more haptic effects. The flow then ends.

FIG. 21 illustrates another flow diagram of the functionality of a haptic conversion module (such as haptic conversion module 16 of FIG. 1), according to another embodiment of the invention. At 2110, one or more parameters are received. At 2120, a plurality of waveforms is generated based on the one or more parameters. At 2130, each waveform is combined with an envelope to generate a grain, where a plurality of grains is generated. At 2140, the grains are combined to generate a cloud, where the cloud is a representation of the plurality of grains. At 2150, a haptic signal is generated based on the cloud. At 2160, the haptic signal is further sent to a haptic output device to generate the one or more haptic effects.

Thus, a system is provided that can receive an input, such as audio data, and that can generate a haptic effect based on the input using a granular synthesis algorithm. The system can further modify the input by shifting a frequency of the input (and possibly filtering the input) in order to improve the quality of the haptic effect generated by the granular synthesis algorithm. Thus, the system can provide a more "organic" and "authentic" haptic effect, such as a haptic texture, that provides a sensation, such as moving a finger over a surface. Further, unique haptic effects can be generated for certain recorded sounds, such as a sound of a marker moving across a paper, a sound of a fountain pen moving across a paper, and a sound of a pencil moving across a paper. Further, a frequency content of a sound can be shifted to a frequency range that is necessary for a more haptically perceptible haptic effect. Thus, the system can improve the quality of generated haptic effects that are based on the input.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A computer-readable medium having instructions stored thereon that, when executed by a processor, cause the processor to convert an input into one or more haptic effects, the converting comprising:
   receiving the input;
   segmenting the input into a plurality of waveforms, wherein each waveform comprises at least a portion of the input;
   combining each waveform with an envelope to generate a grain, wherein a plurality of grains is generated, and wherein each grain comprises an amplitude parameter, a waveform parameter, an envelope parameter, and a duration parameter;
   combining the plurality of grains to generate a cloud, wherein the cloud comprises a representation of the plurality of grains; and
   generating the one or more haptic effects based on the cloud.

2. The computer-readable medium of claim 1, wherein the plurality of grains are positioned at periodic locations within the cloud.

3. The computer-readable medium of claim 2, wherein there is a fixed interval between each grain of the plurality of grains.

4. The computer-readable medium of claim 2, wherein the plurality of grains are overlapping.

5. The computer-readable medium of claim 1, wherein the plurality of grains are positioned at random locations within the cloud.

6. The computer-readable medium of claim 5, wherein there is a random interval between each grain of the plurality of grains.

7. The computer-readable medium of claim 1, the converting further comprising interpolating a first grain and a second grain of the plurality of grains.

8. The computer-readable medium of claim 1,
   wherein each grain of the plurality of grains is mapped to a signal value, and
   wherein the generation of at least one grain of the plurality of grains is triggered by a signal that comprises the signal value.

9. The computer-readable medium of claim 1, wherein each grain further comprises a density parameter.

10. The computer-readable medium of claim 1, the converting further comprising shifting a frequency of the input.

11. The computer-readable medium of claim 10, wherein the shifting the frequency of the input further comprises:
    executing a fast Fourier transform on the input;
    modifying the input; and
    converting the modified input to a time domain.

12. The computer-readable medium of claim 11, wherein the modifying the input further comprises overlapping the input in a frequency domain.

13. The computer-readable medium of claim 11, wherein the modifying the input further comprises:
   identifying at least one frequency of the input that is in a specified range;
   determining a desired haptic output; and
   applying at least one weight to the at least one frequency based on the desired haptic output.

14. The computer-readable medium of claim 10, the converting further comprising filtering the input.

15. The computer-readable medium of claim 14, wherein the input is filtered using a high-pass filter.

16. The computer-readable medium of claim 1, wherein the generating the one or more haptic effects further comprises:
   generating a haptic signal based on the cloud; and
   sending the haptic signal to a haptic output device to generate the one or more haptic effects.

17. The computer-readable medium of claim 16, wherein the haptic output device comprises an actuator.

18. The computer-readable medium of claim 1, wherein the input comprises audio data.

19. The computer-readable medium of claim 18, wherein the audio data is encoded in a pulse code modulation format.

20. The computer-readable medium of claim 18, wherein the audio data is stored in one of an audio file or an audio signal.

21. The computer-readable medium of claim 1, wherein the input comprises video data.

22. The computer-readable medium of claim 1, wherein the input comprises at least one of: image data, text data, or acceleration data.

23. The computer-readable medium of claim 1, wherein the generating the one or more haptic effects further comprises:
   generating a plurality of haptic signals based on the cloud; and
   sending the plurality of haptic signals to a plurality of haptic output devices to generate the one or more haptic effects.

24. A computer-implemented method for converting an input into one or more haptic effects, the computer-implemented method comprising:
   receiving the input;
   segmenting the input into a plurality of waveforms, wherein each waveform comprises at least a portion of the input;
   combining each waveform with an envelope to generate a grain, wherein a plurality of grains is generated, and wherein each grain comprises an amplitude parameter, a waveform parameter, an envelope parameter, and a duration parameter;
   combining the plurality of grains to generate a cloud, wherein the cloud comprises a representation of the plurality of grains; and
   generating the one or more haptic effects based on the cloud.

25. The computer-implemented method of claim 24, wherein the plurality of grains are positioned at periodic locations within the cloud.

26. The computer-implemented method of claim 24, wherein the plurality of grains are positioned at random locations within the cloud.

27. The computer-implemented method of claim 24, the converting further comprising interpolating a first grain and a second grain of the plurality of grains.

28. The computer-implemented method of claim 24,
   wherein each grain of the plurality of grains is mapped to a signal value, and
   wherein the generation of at least one grain of the plurality of grains is triggered by a signal that comprises the signal value.

29. The computer-implemented method of claim 24, the converting further comprising shifting a frequency of the input.

30. The computer-implemented method of claim 29, wherein the shifting the frequency of the input further comprises:
   executing a fast Fourier transform on the input;
   modifying the input; and
   converting the modified input to a time domain.

31. The computer-implemented method of claim 29, wherein the modifying the input further comprises overlapping the input in a frequency domain.

32. The computer-implemented method of claim 29, wherein the modifying the input further comprises:
   identifying at least one frequency of the input that is in a specified range;
   determining a desired haptic output; and
   applying at least one weight to the at least one frequency based on the desired haptic output.

33. The computer-implemented method of claim 29, the converting further comprising filtering the input.

34. The computer-implemented method of claim 24, wherein the generating the one or more haptic effects further comprises:
   generating a plurality of haptic signals based on the cloud; and
   sending the plurality of haptic signals to a plurality of haptic output devices to generate the one or more haptic effects.

35. A system for converting an input into one or more haptic effects, the system comprising:
   a memory configured to store a haptic conversion module; and
   a processor configured to execute the haptic conversion module stored on the memory;
   wherein the haptic conversion module is configured to receive the input;
   wherein the haptic conversion module is further configured to segment the input into a plurality of waveforms, wherein each waveform comprises at least a portion of the input;
   wherein the haptic conversion module is further configured to combine each waveform with an envelope to generate a grain, wherein a plurality of grains is generated, and wherein each grain comprises an amplitude parameter, a waveform parameter, an envelope parameter, and a duration parameter;
   wherein the haptic conversion module is further configured to combine the plurality of grains to generate a cloud, wherein the cloud comprises a representation of the plurality of grains; and
   wherein the haptic conversion module is further configured to generate the one or more haptic effects based on the cloud.

36. The system of claim 35, wherein the plurality of grains are positioned at periodic locations within the cloud.

37. The system of claim 35, wherein the plurality of grains are positioned at random locations within the cloud.

38. The system of claim 35, wherein the haptic conversion module is further configured to interpolate a first grain and a second grain of the plurality of grains.

39. The system of claim 35,
wherein each grain of the plurality of grains is mapped to a signal value, and
wherein the generation of at least one grain of the plurality of grains is triggered by a signal that comprises the signal value.

40. The system of claim 35, wherein the haptic conversion module is further configured to shift a frequency of the input.

41. The system of claim 40, wherein the haptic conversion module is further configured to filter the input.

42. The system of claim 35, wherein the haptic conversion module is further configured to:
generate a plurality of haptic signals based on the cloud; and
send the plurality of haptic signals to a plurality of haptic output devices to generate the one or more haptic effects.

43. A computer-readable medium having instructions stored thereon that, when executed by a processor, cause the processor to convert one or more parameters into one or more haptic effects, the converting comprising:
receiving the one or more parameters;
generating a plurality of waveforms based on the one or more parameters;
combining each waveform with an envelope to generate a grain, wherein a plurality of grains is generated, and wherein each grain comprises an amplitude parameter, a waveform parameter, an envelope parameter, and a duration parameter;
combining the plurality of grains to generate a cloud, wherein the cloud comprises a representation of the plurality of grains; and
generating the one or more haptic effects based on the cloud.

44. A computer-implemented method for converting one or more parameters into one or more haptic effects, the computer-implemented method comprising:
receiving the one or more parameters;
generating a plurality of waveforms based on the one or more parameters;
combining each waveform with an envelope to generate a grain, wherein a plurality of grains is generated, and wherein each grain comprises an amplitude parameter, a waveform parameter, an envelope parameter, and a duration parameter;
combining the plurality of grains to generate a cloud, wherein the cloud comprises a representation of the plurality of grains; and
generating the one or more haptic effects based on the cloud.

45. A system for converting one or more parameters into one or more haptic effects, the system comprising:
a memory configured to store a haptic conversion module; and
a processor configured to execute the haptic conversion module stored on the memory;
wherein the haptic conversion module is configured to receive the one or more parameters;
wherein the haptic conversion module is further configured to generate a plurality of waveforms based on the one or more parameters;
wherein the haptic conversion module is further configured to combine each waveform with an envelope to generate a grain, wherein a plurality of grains is generated, and wherein each grain comprises an amplitude parameter, a waveform parameter, an envelope parameter, and a duration parameter;
wherein the haptic conversion module is further configured to combine the plurality of grains to generate a cloud, wherein the cloud comprises a representation of the plurality of grains; and
wherein the haptic conversion module is further configured to generate the one or more haptic effects based on the cloud.

* * * * *